US012711728B2

(12) United States Patent
Ghazvinian Zanjani et al.

(10) Patent No.: US 12,711,728 B2
(45) Date of Patent: Aug. 18, 2026

(54) PLANAR SPLATTING

(71) Applicant: QUALCOMM Incorporated, San Diego, CA (US)

(72) Inventors: Farhad Ghazvinian Zanjani, Almere (NL); Hong Cai, San Diego, CA (US); Hanno Ackermann, Amsterdam (NL); Leyla Mirvakhabova, Amsterdam (NL); Fatih Murat Porikli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 186 days.

(21) Appl. No.: 18/814,328

(22) Filed: Aug. 23, 2024

(65) Prior Publication Data

US 2025/0272943 A1 Aug. 28, 2025

Related U.S. Application Data

(60) Provisional application No. 63/558,882, filed on Feb. 28, 2024.

(51) Int. Cl.
*G06V 10/26* (2022.01)
*G06V 10/766* (2022.01)
(Continued)

(52) U.S. Cl.
CPC ............ *G06V 10/26* (2022.01); *G06V 10/766* (2022.01); *G06V 10/82* (2022.01); *G06V 10/84* (2022.01)

(58) Field of Classification Search
CPC ...... G06V 10/26; G06V 10/766; G06V 10/82; G06V 10/84; G06V 10/454; G06V 10/54; G06V 10/7764; G06V 10/774; G06V 20/41; G06V 30/18057; G06V 20/698; G06V 30/19173; G06V 30/194; G06V 20/20; G06V 20/64; G06V 20/647; G06V 20/653; G06V 20/70; G06N 3/02; G06N 3/08–088; G06N 3/04; G06N 3/0445; G06N 3/0454; G06N 3/0464; G06N 3/4046;
(Continued)

(56) References Cited

U.S. PATENT DOCUMENTS

2007/0216707 A1* 9/2007 Lee .......................... G06T 5/70
345/611
2021/0142497 A1* 5/2021 Pugh ........................ G06T 7/11

* cited by examiner

*Primary Examiner* — Jose L Couso
(74) *Attorney, Agent, or Firm* — QUALCOMM Incorporated; Espartaco Diaz Hidalgo

(57) ABSTRACT

Techniques are described for image processing. For example, a computing device can segment, using a first neural network, image(s) of a scene to determine respective segments for each of the image(s). The computing device can determine, using a second neural network, normal vectors for each of the image(s). The computing device can generate a graph based on each respective segment for each image, each respective normal vectors for each image, and estimated planar distances. The computing device can partition, based on the normal vectors and the estimated planar distances, the graph to determine indexes associated with Gaussian primitives. The computing device can assign, using linear regression, each descriptor of a plurality of descriptors to an index of the plurality of indexes based on a respective weight. The computing device can merge, using a Gaussian tree, Gaussian primitives of the Gaussian primitives with associated indexes that are similar to each other.

20 Claims, 19 Drawing Sheets

(51) Int. Cl.
*G06V 10/82* (2022.01)
*G06V 10/84* (2022.01)

(58) Field of Classification Search
CPC .... G06N 3/4053; G06N 3/049; G06N 3/0499; G06N 7/00; G06N 7/01; G06N 20/00; G06T 3/4046; G06T 5/60; G06T 9/002; G06T 2207/20076; G06T 2207/20081; G06T 2207/20084; G06T 2211/441; G06T 17/00; G06T 17/20; G06T 19/00; G06T 19/20; G06T 7/11; G06T 7/75; G06T 15/04; G06T 15/08; G06T 15/20; G06T 15/205; G06T 5/70; G06T 5/73; G06T 2210/56; G06T 2219/2004; G06T 2219/2016; G06K 7/1482; G06F 18/213; G06F 18/214; G06F 18/22; G06F 18/241; G06F 18/24; G06F 18/2411; G06F 18/2415; G06F 18/253; G06F 30/27; Y10S 128/925; G09G 5/24

See application file for complete search history.

300
312
314
316
318
310
311
Training posed images
312
314
316
318
320
Leaning model
330

FIG. 3

1200
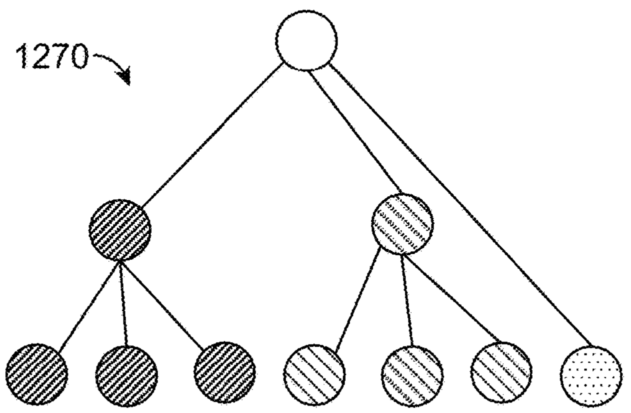
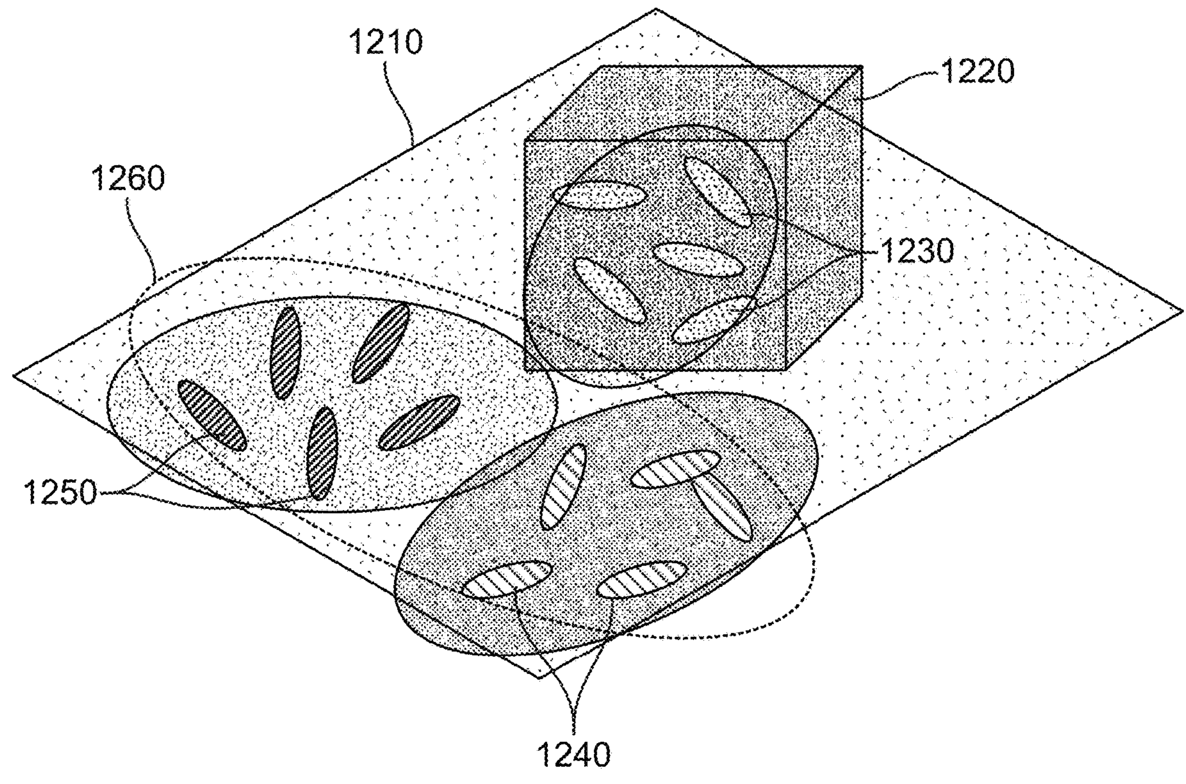
FIG. 12

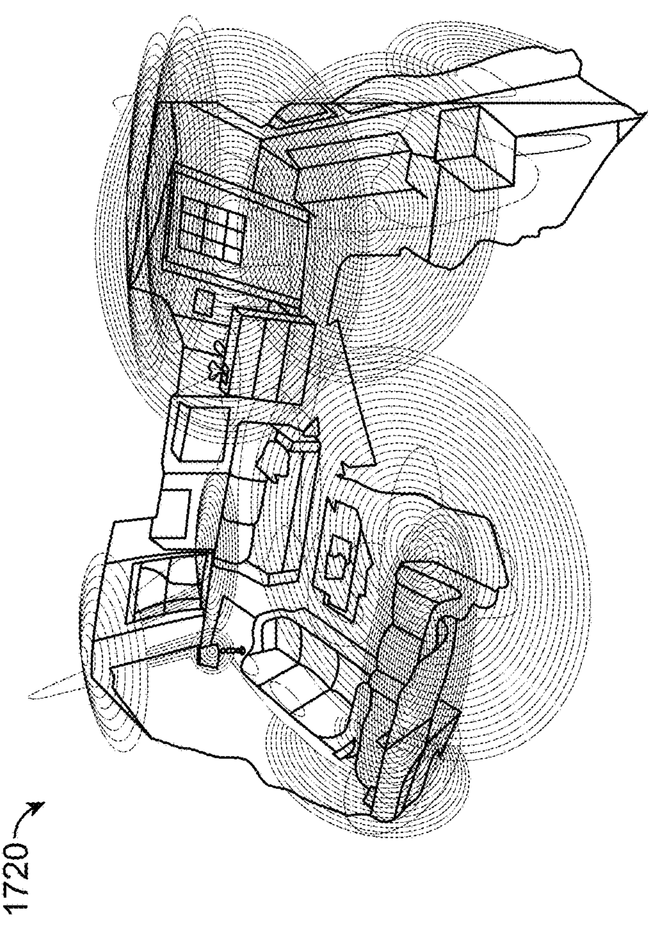
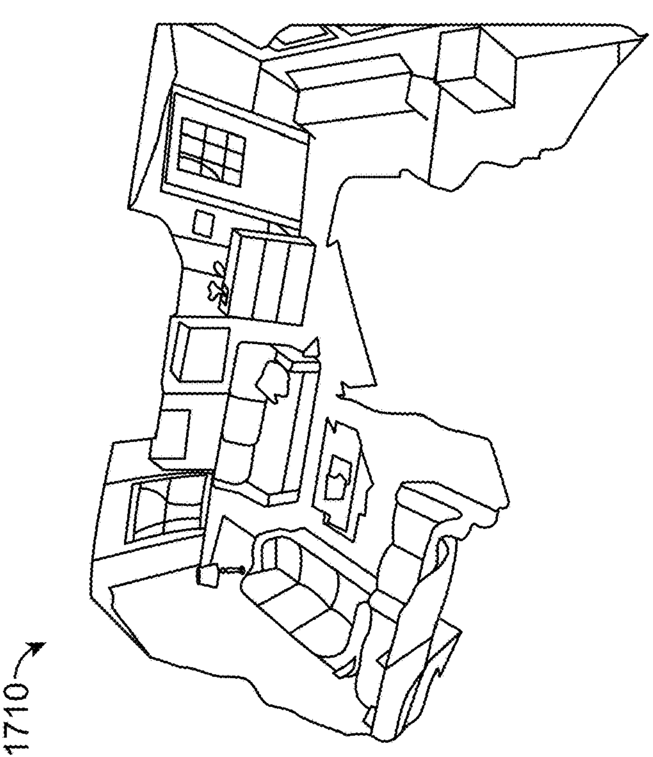
FIG. 17

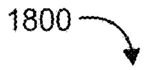

Segment, Using A First Neural Network, The One Or More Images Of A Scene To Determine A Respective Plurality Of Segments For Each Image Of The One Or More Images
1810

Determine, Using A Second Neural Network, A Respective Plurality Of Normal Vectors For Each Image Of The One Or More Images, Wherein Each Normal Vector Of The Respective Plurality Of Normal Vectors Is Orthogonal To A Surface Associated With A Respective Primitive Of A Plurality Of Primitives Associated With An Image Of The One Or More Images
1820

Generate A Graph Based On Each Respective Plurality Of Segments For Each Image, Each Respective Plurality Of Normal Vectors For Each Image, And A Plurality Of Estimated Planar Distances
1830

Partition, Based On Each Respective Plurality Of Normal Vectors And The Plurality Of Estimated Planar Distances, The Graph To Determine A Plurality Of Indexes Associated With The Plurality Of Primitives
1840

Assign Each Descriptor Of A Plurality Of Descriptors To An Index Of The Plurality Of Indexes Based On A Respective Weight
1850

Merge Primitives Of The Plurality Of Primitives With Associated Indexes Of The Plurality Of Indexes That Are Similar To Each Other
1860

FIG. 18

PLANAR SPLATTING

CROSS-REFERENCE TO RELATED APPLICATION

This application claims the benefit of, and priority to, U.S. Provisional Application No. 63/558,882, filed Feb. 28, 2024, which is hereby incorporated by reference, in its entirety and for all purposes.

FIELD

The present disclosure generally relates to image processing. For example, aspects of the present disclosure relate to planar splatting (e.g., Planar Gaussian Splatting).

BACKGROUND

Many devices and systems allow a scene to be captured by generating images (or frames) and/or video data (including multiple frames) of the scene. For example, a camera or a device including a camera can capture a sequence of frames of a scene (e.g., a video of a scene). In some cases, the sequence of frames can be processed for performing one or more functions, can be output for display, can be output for processing and/or consumption by other devices, among other uses.

An artificial neural network attempts to replicate, using computer technology, logical reasoning performed by the biological neural networks that constitute animal brains. Deep neural networks, such as convolutional neural networks, are widely used for numerous applications, such as object detection, object classification, object tracking, big data analysis, among others.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

Disclosed are systems, apparatuses, methods and computer-readable media for monotonic regularization for planar splatting (e.g., planar Gaussian splatting). According to at least one example, an apparatus is provided to process one or more images. The apparatus includes one or more memories configured to store one or more images and one or more processors coupled to the one or more memories and configured to: segment, using a first neural network, the one or more images of a scene to determine a respective plurality of segments for each image of the one or more images; determine, using a second neural network, a respective plurality of normal vectors for each image of the one or more images, wherein each normal vector of the respective plurality of normal vectors is orthogonal to a surface associated with a respective primitive of a plurality of primitives associated with an image of the one or more images; generate a graph based on each respective plurality of segments for each image, each respective plurality of normal vectors for each image, and a plurality of estimated planar distances; partition, based on each respective plurality of normal vectors and the plurality of estimated planar distances, the graph to determine a plurality of indexes associated with the plurality of primitives; assign each descriptor of a plurality of descriptors to an index of the plurality of indexes based on a respective weight; and merge primitives of the plurality of primitives with associated indexes of the plurality of indexes that are similar to each other.

In another illustrative example, a method is provided for image processing. The method includes: segmenting, using a first neural network, the one or more images of a scene to determine a respective plurality of segments for each image of the one or more images; determining, using a second neural network, a respective plurality of normal vectors for each image of the one or more images, wherein each normal vector of the respective plurality of normal vectors is orthogonal to a surface associated with a respective primitive of a plurality of primitives associated with an image of the one or more images; generating a graph based on each respective plurality of segments for each image, each respective plurality of normal vectors for each image, and a plurality of estimated planar distances; partitioning, based on each respective plurality of normal vectors and the plurality of estimated planar distances, the graph to determine a plurality of indexes associated with the plurality of primitives; assigning each descriptor of a plurality of descriptors to an index of the plurality of indexes based on a respective weight; and merging primitives of the plurality of primitives with associated indexes of the plurality of indexes that are similar to each other.

In another illustrative example, a non-transitory computer-readable medium is provided having stored thereon instructions that, when executed by one or more processors, cause the one or more processors to: segment, using a first neural network, one or more images of a scene to determine a respective plurality of segments for each image of the one or more images; determine, using a second neural network, a respective plurality of normal vectors for each image of the one or more images, wherein each normal vector of the respective plurality of normal vectors is orthogonal to a surface associated with a respective primitive of a plurality of primitives associated with an image of the one or more images; generate a graph based on each respective plurality of segments for each image, each respective plurality of normal vectors for each image, and a plurality of estimated planar distances; partition, based on each respective plurality of normal vectors and the plurality of estimated planar distances, the graph to determine a plurality of indexes associated with the plurality of primitives; assign each descriptor of a plurality of descriptors to an index of the plurality of indexes based on a respective weight; and merge primitives of the plurality of primitives with associated indexes of the plurality of indexes that are similar to each other.

In another illustrative example, an apparatus is provided to process one or more images. The apparatus includes: means for segmenting, using a first neural network, the one or more images of a scene to determine a respective plurality of segments for each image of the one or more images; means for determining, using a second neural network, a respective plurality of normal vectors for each image of the one or more images, wherein each normal vector of the respective plurality of normal vectors is orthogonal to a surface associated with a respective primitive of a plurality of primitives associated with an image of the one or more images; means for generating a graph based on each respective plurality of segments for each image, each respective plurality of normal vectors for each image, and a plurality of estimated planar distances; means for partitioning, based on each respective plurality of normal vectors and the plurality of estimated planar distances, the graph to determine a plurality of indexes associated with the plurality of primitives; means for assigning each descriptor of a plurality of descriptors to an index of the plurality of indexes based on a respective weight; and means for merging primitives of the plurality of primitives with associated indexes of the plurality of indexes that are similar to each other.

Aspects generally include a method, apparatus, system, computer program product, non-transitory computer-readable medium, user device, user equipment, wireless communication device, and/or processing system as substantially described with reference to and as illustrated by the drawings and specification.

In some aspects, each of the apparatuses described above is, can be part of, or can include a mobile device, a smart or connected device, a camera system, and/or an extended reality (XR) device (e.g., a virtual reality (VR) device, an augmented reality (AR) device, or a mixed reality (MR) device). In some examples, the apparatuses can include or be part of a vehicle, a mobile device (e.g., a mobile telephone or so-called "smart phone" or other mobile device), a wearable device, a personal computer, a laptop computer, a tablet computer, a server computer, a robotics device or system, an aviation system, or other device. In some aspects, the apparatus includes an image sensor (e.g., a camera) or multiple image sensors (e.g., multiple cameras) for capturing one or more images. In some aspects, the apparatus includes one or more displays for displaying one or more images, notifications, and/or other displayable data. In some aspects, the apparatus includes one or more speakers, one or more light-emitting devices, and/or one or more microphones. In some aspects, the apparatuses described above can include one or more sensors. In some cases, the one or more sensors can be used for determining a location of the apparatuses, a state of the apparatuses (e.g., a tracking state, an operating state, a temperature, a humidity level, and/or other state), and/or for other purposes.

Some aspects include a device having a processor configured to perform one or more operations of any of the methods summarized above. Further aspects include processing devices for use in a device configured with processor-executable instructions to perform operations of any of the methods summarized above. Further aspects include a non-transitory processor-readable storage medium having stored thereon processor-executable instructions configured to cause a processor of a device to perform operations of any of the methods summarized above. Further aspects include a device having means for performing functions of any of the methods summarized above.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims. The foregoing, together with other features and aspects, will become more apparent upon referring to the following specification, claims, and accompanying drawings.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The preceding, together with other features and embodiments, will become more apparent upon referring to the following specification, claims, and accompanying drawings.

BRIEF DESCRIPTION OF THE DRAWINGS

Illustrative aspects of the present application are described in detail below with reference to the following figures:

FIG. 3 illustrates an example of three-dimensional (3D) planar reconstruction of a scene using multiple training posed images, in accordance with some examples.

FIG. 12 illustrates an example of tree-based Gaussian merging, in accordance with some examples.

FIG. 17 is a diagram illustrating an example of a visualization of a root's child nodes in a Gaussian Mixture Model-tree (GMM-tree), which represents different Gaussian distributions that indicate distinct plane instances, in accordance with some examples.

FIG. 18 is a flow diagram illustrating an example of a process for image processing, in accordance with some examples.

DETAILED DESCRIPTION

Figure 1:
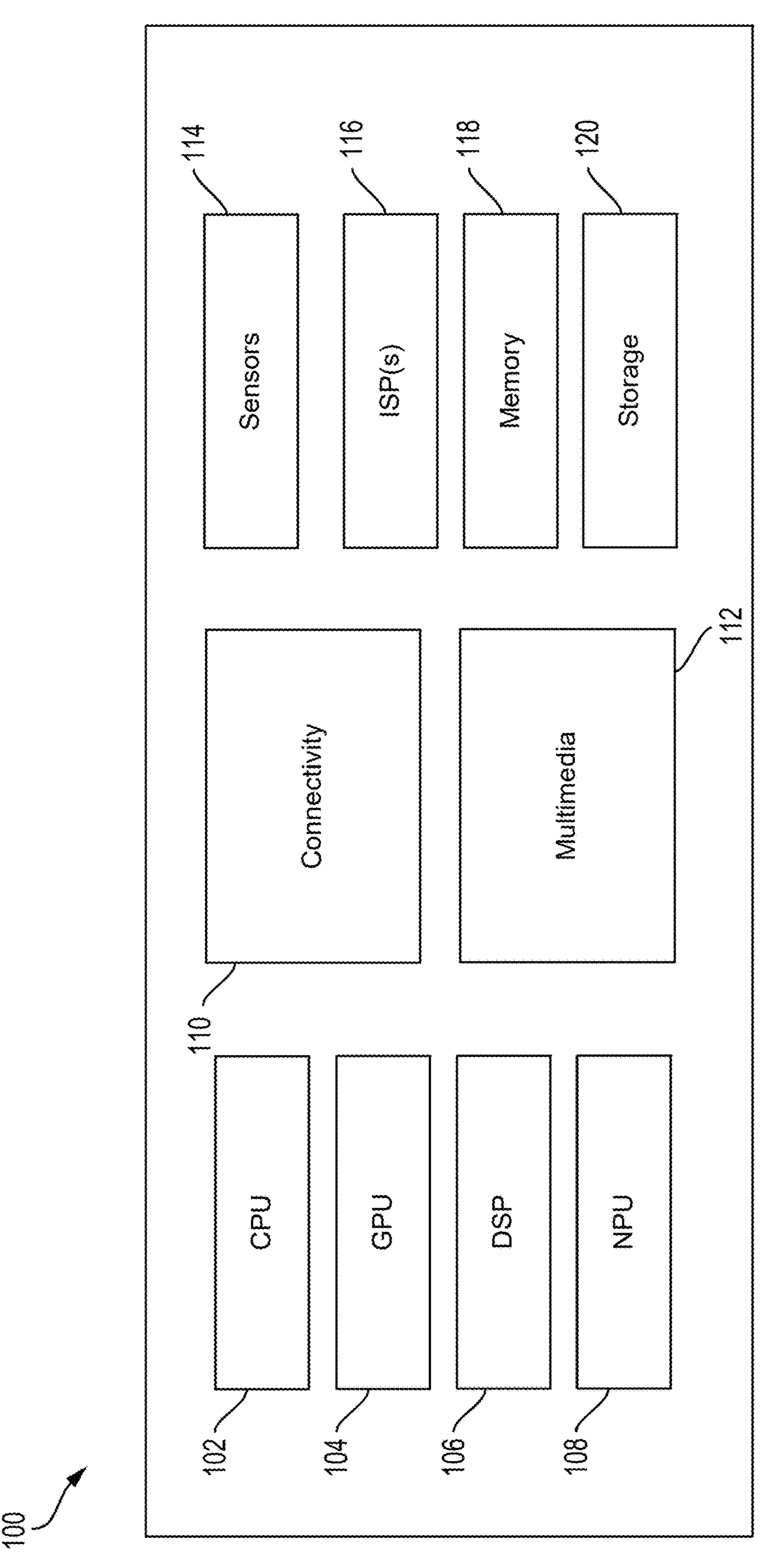
FIG. 1 illustrates an example implementation of a system-on-a-chip (SoC), in accordance with some examples.

Certain aspects of this disclosure are provided below for illustration purposes. Alternate aspects may be devised without departing from the scope of the disclosure. Additionally, well-known elements of the disclosure will not be described in detail or will be omitted so as not to obscure the relevant details of the disclosure. Some of the aspects described herein can be applied independently and some of them may be applied in combination as would be apparent to those of skill in the art. In the following description, for the purposes of explanation, specific details are set forth in order to provide a thorough understanding of aspects of the application. However, it will be apparent that various aspects may be practiced without these specific details. The figures and description are not intended to be restrictive.

The ensuing description provides example aspects only, and is not intended to limit the scope, applicability, or configuration of the disclosure. Rather, the ensuing description of the example aspects will provide those skilled in the art with an enabling description for implementing an example aspect. It should be understood that various changes may be made in the function and arrangement of elements without departing from the spirit and scope of the application as set forth in the appended claims.

The terms "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Three-dimensional (3D) planar reconstruction involves representing and reconstructing a scene by a set of 3D planes. This level of abstract modeling is applicable to many various different use cases, such as XR/VR, robotic, autonomous driving, interior modeling, and/or gaming applications. Currently, existing 3D planar reconstruction methods have many issues. For example, existing methods require either availability of 3D geometry or 3D plane annotations. Moreover, these models often suffer from a domain-shift issue when the inference images have different properties than those being used during training. As such, improved systems and techniques for 3D planar reconstruction can be beneficial.

In one or more aspects, systems, apparatuses, processes (also referred to as methods), and computer-readable media (collectively referred to herein as "systems and techniques") are described herein for providing planar splatting. An illustrative example of planar splatting described herein is Planar Gaussian Splatting (PGS). In one or more examples, the planar splatting (e.g., Planar Gaussian Splatting) can be performed as a per-scene optimization method. In some cases, the planar splatting (e.g., Planar Gaussian Splatting) can jointly learn the 3D geometry and parsing of planar surfaces of a scene. The planar splatting (e.g., Planar Gaussian Splatting) described herein does not require 3D plane annotations and can be adopted for various different scenes by providing only a collection of posed images captured (e.g., obtained) from various angles (e.g., camera poses).

In one or more examples, the planar splatting (e.g., Planar Gaussian Splatting) is a neural rendering method for reconstructing and parsing 3D planes directly from multiple images (e.g., red, green, blue (RGB) images, images in the luma-chroma domain, etc.). In one or more examples, the planar splatting can utilize additional parameters (e.g., Planar Gaussian Splatting can use parameters from the standard parameters used for Gaussian Splatting) for primitives (e.g., 3D Gaussian primitives) to simultaneously learn the 3D geometry and decompose surfaces into individual planes. In some examples, the planar splatting (e.g., Planar Gaussian Splatting) can leverage 2D mask proposals from a Segment Anything Model (SAM) obtained from multiple viewpoints, and can lift the 2D mask proposals into 3D space by enforcing a planarity constraint on the location of the primitives (e.g., the 3D Gaussian primitives). The grouping of the primitives (e.g., the 3D Gaussian primitives) can be accomplished by using a hierarchical Gaussian Mixture Model (GMM), which may be referred to as a GMM-tree structure. Similar primitives (e.g., Gaussians) may then be progressively merged probabilistically to cluster all of the primitives and to incorporate the primitives into the scene geometry.

The planar splatting systems and techniques described herein provide a solution that addresses the issues with the existing 3D planar reconstruction methods. For example, the planar splatting systems and techniques address the problem of correspondence assignment by determining assignments (e.g., using linear regression or other algorithm) between embedding vectors (e.g., descriptors) and the label space (indices from the SAM network). In some cases, the parameters (e.g., weights) of a linear layer can be reinitialized per iteration. Such a technique addresses the variable size matching problem and handles the change of target label indices across iterations.

The planar splatting systems and techniques described herein can achieve state-of-the-art performance in 3D planar reconstruction without requiring 3D plane labels or depth supervision. Importantly, unlike existing methods that struggle with new datasets due to domain shift, the planar splatting can maintain its performance, due to its neural rendering and scene-specific optimization, while also being able to process significantly faster than existing optimization-based approaches.

The planar splatting (e.g., Gaussian Planar Splatting) can be employed for various different use cases. For example, the planar splatting can enable XR/VR gaming applications. In one or more examples, an AR/VR game could be designed to take place on a virtual table with objects appearing to interact with the real-world surfaces. Virtual objects could be placed and anchored onto planar surfaces to improve realism of the XR/AR. The planarity (or perception about the planarity) of the scene is important in many XR/VR applications. In another example, the planar splatting can be used in navigation applications (e.g., for autonomous driving or navigation of robots) for identifying planar surfaces (e.g., to support an AR navigation application) to highlight a path to take based on the planar surfaces within the environment. For example, the planar splatting can be used for navigation of a robot to provide the robot with a path to follow on the floor that avoids obstacles (e.g., a wall and/or furniture on planes). In another example, the planar splatting can be used for planar image tracking for recognizing and tracking planar images.

In one or more examples, the planar splatting (e.g., Planar Gaussian Splatting) may be employed for inferring 3D planar geometry and parsing plane instances in indoor scenes using 2D posed images. In some examples, the planar splatting can allow for additional parametrization of primitives (e.g., Gaussians), which can introduce the capability of parsing the primitives (e.g., Gaussians) belonging to distinct 3D planes. In one or more examples, a binary tree can be used to introduce a probability framework for defining a hierarchical structure to aggregate primitives (e.g., Gaussians) in a bottom-up procedure. A binary tree is a restricted form of graphs. In some aspects, the binary tree can be a Gaussian tree or other type of graph. In some examples, the planar splatting (e.g., the Gaussian Planar Splatting) described herein does not require 3D plane annotations. Instead, the planar splatting (e.g., Gaussian Planar Splatting) can utilize a pretrained SAM and 2D normal map prediction networks (e.g., neural networks) for detecting planar patches in 2D images. In one or more examples, a Region Adjacency Graph (RAG) can be employed for merging image segments (e.g., patches) into planar regions, which can be used as pseudo labels for training. In some examples, the planar splatting (e.g., is able to distinguish separate planar surfaces with identical surface normals (e.g., normal vectors) and heights, where most existing methods, such as random sample consensus (RANSAC), are not able to distinguish separate planar surfaces with identical surface normals and heights.

In one or more aspects, the systems and techniques can employ an apparatus to process one or more images. In one or more examples, the apparatus can include one or more memories configured to store one or more images. The apparatus can further include one or more processors that may be coupled to the one or more memories and configured to: segment, using a first neural network, the one or more images of a scene to determine a respective plurality of segments for each image of the one or more images; determine, using a second neural network, a respective plurality of normal vectors for each image of the one or more images, wherein each normal vector of the respective plurality of normal vectors is orthogonal to a surface associated with a primitive of a plurality of primitives (e.g., a respective Gaussian primitive of a plurality of Gaussian primitives) associated with an image of the one or more images; generate a graph based on each respective plurality of segments for each image, each respective plurality of normal vectors for each image, and a plurality of estimated planar distances; partition, based on each respective plurality of normal vectors and the plurality of estimated planar distances, the graph to determine a plurality of indexes associated with the plurality of primitives (e.g., Gaussian primitives); assign (e.g., using linear regression, a Hungarian matching algorithm, a Sinkhorn distance algorithm, or other algorithm) each descriptor of a plurality of descriptors to an index of the plurality of indexes based on a respective weight; and merge (e.g., using a binary tree, such as a Gaussian tree), primitives of the plurality of primitives (e.g., Gaussian primitives of the plurality of Gaussian primitives) with associated indexes of the plurality of indexes that are similar to each other.

In one or more examples, the first neural network can be a SAM. In some examples, the second neural network can be a normal neural network. In one or more examples, the graph can be a RAG. In some examples, each segment of the plurality of segments can be represented as a node of a plurality of nodes in the graph. In one or more examples, each node of the plurality of nodes can be connected by one or more edges to one or more adjacent nodes of the plurality of nodes. In some examples, the graph may be partitioned by removing at least one of the one or more edges. In one or more examples, the one or more processors can be further configured to update, using a recurrent-mean shift, the plurality of descriptors.

Additional aspects of the present disclosure are described in more detail below.

FIG. 1 illustrates an example implementation of a system-on-a-chip (SOC) 100, which may include a central processing unit (CPU) 102 or a multi-core CPU, configured to perform one or more of the functions described herein. Parameters or variables (e.g., neural signals and synaptic weights), system parameters associated with a computational device (e.g., neural network with weights), delays, frequency bin information, task information, among other information may be stored in a memory block associated with a neural processing unit (NPU) 108, in a memory block associated with a CPU 102, in a memory block associated with a graphics processing unit (GPU) 104, in a memory block associated with a digital signal processor (DSP) 106, in a memory block 118, and/or may be distributed across multiple blocks. Instructions executed at the CPU 102 may be loaded from a program memory associated with the CPU 102 or may be loaded from the memory block 118.

The SOC 100 may also include additional processing blocks tailored to specific functions, such as a GPU 104, a DSP 106, a connectivity block 110, which may include fifth generation (5G) connectivity, fourth generation long term evolution (4G LTE) connectivity, Wi-Fi connectivity, USB connectivity, Bluetooth connectivity, and the like, and a multimedia processor 112 that may, for example, detect and recognize gestures. In one implementation, the NPU is implemented in the CPU 102, the DSP 106, and/or the GPU 104. The SOC 100 may also include one or more sensors 114, image signal processors (ISPs) 116, and/or storage 120.

The SOC 100 may be based on an ARM instruction set. In an aspect of the present disclosure, the instructions loaded into the CPU 102 may comprise code to search for a stored multiplication result in a lookup table (LUT) corresponding to a multiplication product of an input value and a filter weight. The instructions loaded into the CPU 102 may also comprise code to disable a multiplier during a multiplication operation of the multiplication product when a lookup table hit of the multiplication product is detected. In addition, the instructions loaded into the CPU 102 may comprise code to store a computed multiplication product of the input value and the filter weight when a lookup table miss of the multiplication product is detected.

SOC 100 and/or components thereof may be configured to perform image processing using machine learning techniques according to aspects of the present disclosure discussed herein. For example, SOC 100 and/or components thereof may be configured to perform disparity estimation refinement for pairs of images (e.g., stereo image pairs, each including a left image and a right image). SOC 100 can be part of a computing device or multiple computing devices. In some examples, SOC 100 can be part of an electronic device (or devices) such as a camera system (e.g., a digital camera, an IP camera, a video camera, a security camera, etc.), a telephone system (e.g., a smartphone, a cellular telephone, a conferencing system, etc.), a desktop computer, an XR device (e.g., a head-mounted display, etc.), a smart wearable device (e.g., a smart watch, smart glasses, etc.), a laptop or notebook computer, a tablet computer, a set-top box, a television, a display device, a system-on-chip (SoC), a digital media player, a gaming console, a video streaming device, a server, a drone, a computer in a car, an Internet-of-Things (IoT) device, or any other suitable electronic device(s).

In some implementations, the CPU 102, the GPU 104, the DSP 106, the NPU 108, the connectivity block 110, the multimedia processor 112, the one or more sensors 114, the ISPs 116, the memory block 118 and/or the storage 120 can be part of the same computing device. For example, in some cases, the CPU 102, the GPU 104, the DSP 106, the NPU 108, the connectivity block 110, the multimedia processor 112, the one or more sensors 114, the ISPs 116, the memory block 118 and/or the storage 120 can be integrated into a smartphone, laptop, tablet computer, smart wearable device, video gaming system, server, and/or any other computing device. In other implementations, the CPU 102, the GPU 104, the DSP 106, the NPU 108, the connectivity block 110, the multimedia processor 112, the one or more sensors 114, the ISPs 116, the memory block 118 and/or the storage 120 can be part of two or more separate computing devices.

Machine learning (ML) can be considered a subset of artificial intelligence (AI). ML systems can include algorithms and statistical models that computer systems can use to perform various tasks by relying on patterns and inference, without the use of explicit instructions. One example of a ML system is a neural network (also referred to as an artificial neural network), which may include an interconnected group of artificial neurons (e.g., neuron models). Neural networks may be used for various applications and/or devices, such as image and/or video coding, image analysis and/or computer vision applications, Internet Protocol (IP) cameras, Internet of Things (IoT) devices, autonomous vehicles, service robots, among others.

Individual nodes in a neural network may emulate biological neurons by taking input data and performing simple operations on the data. The results of the simple operations performed on the input data are selectively passed on to other neurons. Weight values are associated with each vector and node in the network, and these values constrain how input data is related to output data. For example, the input data of each node may be multiplied by a corresponding weight value, and the products may be summed. The sum of the products may be adjusted by an optional bias, and an activation function may be applied to the result, yielding the node's output signal or "output activation" (sometimes referred to as a feature map or an activation map). The weight values may initially be determined by an iterative flow of training data through the network (e.g., weight values are established during a training phase in which the network learns how to identify particular classes by their typical input data characteristics).

Different types of neural networks exist, such as convolutional neural networks (CNNs), recurrent neural networks (RNNs), generative adversarial networks (GANs), multilayer perceptron (MLP) neural networks, transformer neural networks, among others. For instance, convolutional neural networks (CNNs) are a type of feed-forward artificial neural network. Convolutional neural networks may include collections of artificial neurons that each have a receptive field (e.g., a spatially localized region of an input space) and that collectively tile an input space. RNNs work on the principle of saving the output of a layer and feeding the output back to the input to help in predicting an outcome of the layer. A GAN is a form of generative neural network that can learn patterns in input data so that the neural network model can generate new synthetic outputs that reasonably could have been from the original dataset. A GAN can include two neural networks that operate together, including a generative neural network that generates a synthesized output and a discriminative neural network that evaluates the output for authenticity. In MLP neural networks, data may be fed into an input layer, and one or more hidden layers provide levels of abstraction to the data. Predictions may then be made on an output layer based on the abstracted data.

Deep learning (DL) is one example of a machine learning technique and can be considered a subset of ML. Many DL approaches are based on a neural network, such as an RNN or a CNN, and utilize multiple layers. The use of multiple layers in deep neural networks can permit progressively higher-level features to be extracted from a given input of raw data. For example, the output of a first layer of artificial neurons becomes an input to a second layer of artificial neurons, the output of a second layer of artificial neurons becomes an input to a third layer of artificial neurons, and so on. Layers that are located between the input and output of the overall deep neural network are often referred to as hidden layers. The hidden layers learn (e.g., are trained) to transform an intermediate input from a preceding layer into a slightly more abstract and composite representation that can be provided to a subsequent layer, until a final or desired representation is obtained as the final output of the deep neural network.

As noted above, a neural network is an example of a machine learning system, and can include an input layer, one or more hidden layers, and an output layer. Data is provided from input nodes of the input layer, processing is performed by hidden nodes of the one or more hidden layers, and an output is produced through output nodes of the output layer. Deep learning networks typically include multiple hidden layers. Each layer of the neural network can include feature maps or activation maps that can include artificial neurons (or nodes). A feature map can include a filter, a kernel, or the like. The nodes can include one or more weights used to indicate an importance of the nodes of one or more of the layers. In some cases, a deep learning network can have a series of many hidden layers, with early layers being used to determine simple and low-level characteristics of an input, and later layers building up a hierarchy of more complex and abstract characteristics.

A deep learning architecture may learn a hierarchy of features. If presented with visual data, for example, the first layer may learn to recognize relatively simple features, such as edges, in the input stream. In another example, if presented with auditory data, the first layer may learn to recognize spectral power in specific frequencies. The second layer, taking the output of the first layer as input, may learn to recognize combinations of features, such as simple shapes for visual data or combinations of sounds for auditory data. For instance, higher layers may learn to represent complex shapes in visual data or words in auditory data. Still higher layers may learn to recognize common visual objects or spoken phrases. Deep learning architectures may perform especially well when applied to problems that have a natural hierarchical structure. For example, the classification of motorized vehicles may benefit from first learning to recognize wheels, windshields, and other features. These features may be combined at higher layers in different ways to recognize cars, trucks, and airplanes.

Neural networks may be designed with a variety of connectivity patterns. In feed-forward networks, information is passed from lower to higher layers, with each neuron in a given layer communicating to neurons in higher layers. A hierarchical representation may be built up in successive layers of a feed-forward network, as described above. Neural networks may also have recurrent or feedback (also called top-down) connections. In a recurrent connection, the output from a neuron in a given layer may be communicated to another neuron in the same layer. A recurrent architecture may be helpful in recognizing patterns that span more than one of the input data chunks that are delivered to the neural network in a sequence. A connection from a neuron in a given layer to a neuron in a lower layer is called a feedback (or top-down) connection. A network with many feedback connections may be helpful when the recognition of a high-level concept may aid in discriminating the particular low-level features of an input.

Figure 2A:
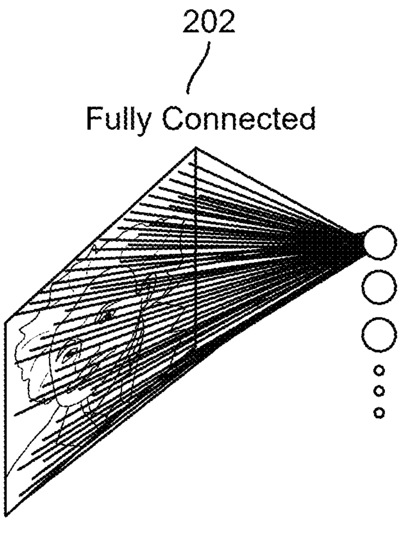
FIG. 2A illustrates an example of a fully connected neural network, in accordance with some examples.
Figure 2B:
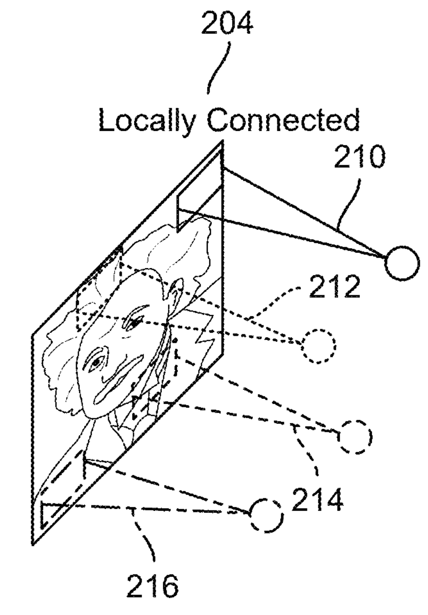
FIG. 2B illustrates an example of a locally connected neural network, in accordance with some examples.

The connections between layers of a neural network may be fully connected or locally connected. FIG. 2A illustrates an example of a fully connected neural network 202. In a fully connected neural network 202, a neuron in a first hidden layer may communicate its output to every neuron in a second hidden layer, so that each neuron in the second layer will receive input from every neuron in the first layer. FIG. 2B illustrates an example of a locally connected neural network 204. In a locally connected neural network 204, a neuron in a first hidden layer may be connected to a limited number of neurons in a second hidden layer. More generally, a locally connected layer of the locally connected neural network 204 may be configured so that each neuron in a layer will have the same or a similar connectivity pattern, but with connections strengths that may have different values (e.g., 210, 212, 214, and 216). The locally connected connectivity pattern may give rise to spatially distinct receptive fields in a higher layer, because the higher layer neurons in a given region may receive inputs that are tuned through training to the properties of a restricted portion of the total input to the network.

Figure 2C:
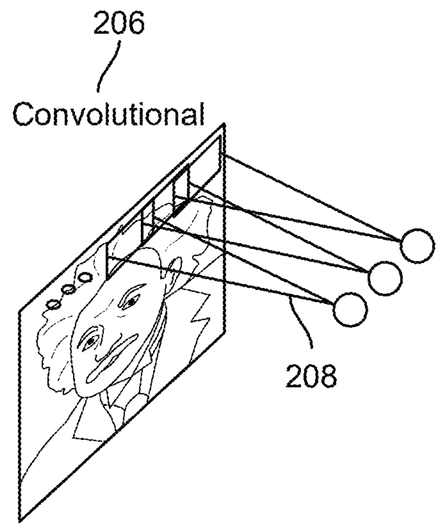
FIG. 2C illustrates an example of a convolutional neural network, in accordance with some examples.

One example of a locally connected neural network is a convolutional neural network. FIG. 2C illustrates an example of a convolutional neural network 206. The convolutional neural network 206 may be configured such that the connection strengths associated with the inputs for each neuron in the second layer are shared (e.g., 208). Convolutional neural networks may be well suited to problems in which the spatial location of inputs is meaningful. Convolutional neural network 206 may be used to perform one or more aspects of video compression and/or decompression, according to aspects of the present disclosure.

The performance of 3D planar reconstruction can be based on generating 3D meshes corresponding to one or more 2D images of a scene. In some aspects, the one or more 2D images of a scene can be obtained as image data captured by a monocular moving camera. For example, the one or more 2D images of the scene can be a sequence of color images captured by a monocular moving camera.

Figure 3:
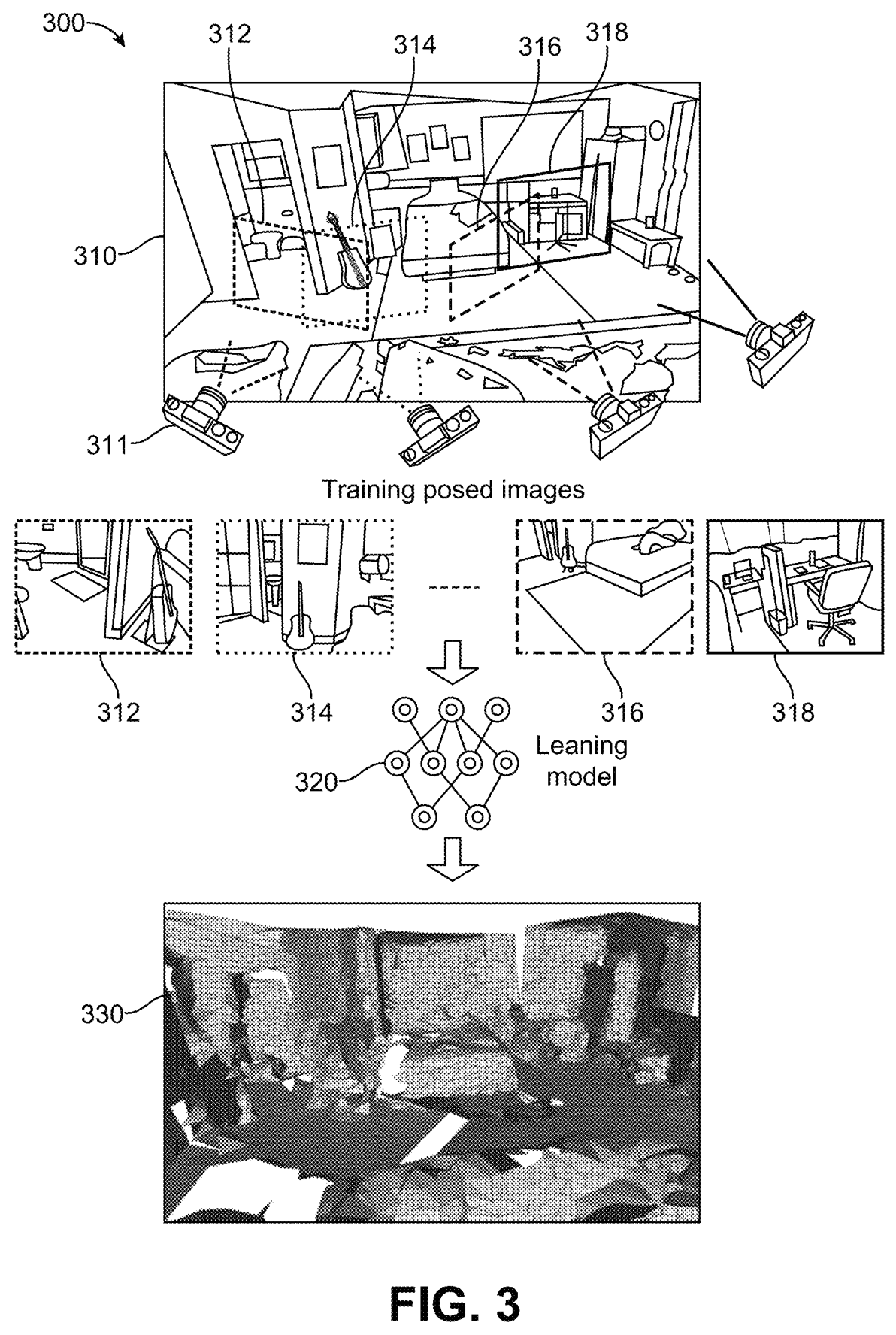

FIG. 3 illustrates an example of 3D planar reconstruction 300 of a scene using multiple training posed images. As used herein, a scene can refer to an environment, area, location, etc., that is represented in or by the one or more 2D image inputs. For instance, the scene 310 depicted in FIG. 3 is an indoor scene corresponding to an interior room of a house or building. A plurality of images 312, 314, 316, 318 can be captured by a monocular moving camera 311. For example, a first image 312 can be captured from a first location of the monocular moving camera 311 and corresponds to a first portion of the scene 310; a second image 314 can be captured from a second location of the monocular moving camera 311 and corresponds to a second portion of the scene 310; a third image 316 can be captured from a third location of the monocular moving camera 311 and corresponds to a third portion of the scene 310; a fourth image 318 can be captured from a fourth location of the monocular moving camera 311 and corresponds to a fourth portion of the scene 310; etc.

In some aspects, each of the images 312-318 corresponds to a different view of the scene 310 and additionally corresponds to a different pose of the monocular moving camera 311. Each of the images 312-318 can be a color image. The pose of the monocular moving camera 311 (e.g., the camera pose associated with or corresponding to each of the images 312-318) can also be referred to as extrinsic information of the camera and/or can be included in extrinsic information of the monocular moving camera 311. In some aspects, intrinsic information or parameters of the monocular moving camera 311 can additionally be utilized and/or associated with the images 312-318 (e.g., focal length, sensor size, sensor location or origin coordinate, etc.).

In one illustrative example, a learning model 320 can receive some (or all) of the images 312-318 as input. The learning model 320 can additionally receive the extrinsic information and/or the intrinsic information associated with monocular moving camera 311 as input.

In some cases, the input images provided to learning model 320 (e.g., images 312-318) can be a subset of a plurality of images captured using monocular moving camera 311. Based on the 2D input images 312-318 and the extrinsic and/or intrinsic information of monocular moving camera 311, the learning model 320 can generate a 3D planar reconstruction 330 corresponding to the scene 310. For example, the learning model 320 can generate a 3D planar reconstruction 330 based on performing 3D geometry learning to generate 3D meshes corresponding to planar surfaces within the scene 310 and depicted within the 2D input images 312-318. The learning model 320 can additionally perform planar segmentation to label each vertex of a plurality of vertices included in the 3D mesh with information indicative of a particular plane instance that includes each respective vertex of the 3D mesh.

As previously mentioned, 3D planar reconstruction involves representing and reconstructing a scene by a set of 3D planes. This level of abstract modeling can be applicable to many various different use cases (e.g., XR/VR, robotic, autonomous driving, interior modeling, and/or gaming applications). Existing current 3D planar reconstruction methods have many issues. In one or more examples, existing methods can require either availability of 3D geometry or 3D plane annotations. These models also often suffer from a domain-shift issue when the inference images have different properties than those being used during training. Therefore, improved systems and techniques for 3D planar reconstruction can be useful.

As noted above, according to one or more aspects, the systems and techniques provide planar splatting (e.g., Planar Gaussian Splatting) to address the issues with the existing 3D planar reconstruction methods. In one or more examples, the planar splatting is a per-scene optimization method. The planar splatting can jointly learn the 3D geometry and parsing of planar surfaces of a scene. The planar splatting does not require 3D plane annotations and may be adopted for various different scenes by providing only a collection of posed images captured (e.g., obtained) from various angles (e.g., camera poses).

The planar splatting is a neural rendering method for reconstructing and parsing 3D planes directly from multiple RGB images. In one or more examples, the planar splatting may utilize additional parameters (e.g., from the standard parameters used for Gaussian Splatting) for 3D primitives (e.g., 3D Gaussian primitives) to simultaneously learn the 3D geometry and decompose surfaces into individual planes. In some examples, the planar splatting can leverage 2D mask proposals from a SAM obtained from multiple viewpoints, and can lift the 2D mask proposals into a 3D space by enforcing a planarity constraint on the location of the primitives (e.g., the 3D Gaussian primitives). For instance, the grouping of 3D Gaussian primitives can be accomplished by using a hierarchical GMM, which may be referred to as a GMM-tree structure. Similar primitives (e.g., Gaussians) may be progressively merged probabilistically to cluster all of the primitives and to incorporate the primitives into the scene geometry. The planar splatting can achieve state-of-the-art performance in 3D planar reconstruction without requiring 3D plane labels or depth supervision. Importantly, unlike existing methods that struggle with new datasets due to domain shift, the planar splatting can maintain its performance, due to its neural rendering and scene-specific optimization, while also being able to process significantly faster than existing optimization-based approaches.

Illustrative examples of planar splatting described herein refer to Planar Gaussian Splatting (PGS). However, the planar splatting can be based on other types of primitives (e.g., each primitive including a learnable normal vector and a plane-instance embedding vector) other than Gaussian primitives.

Figure 4:
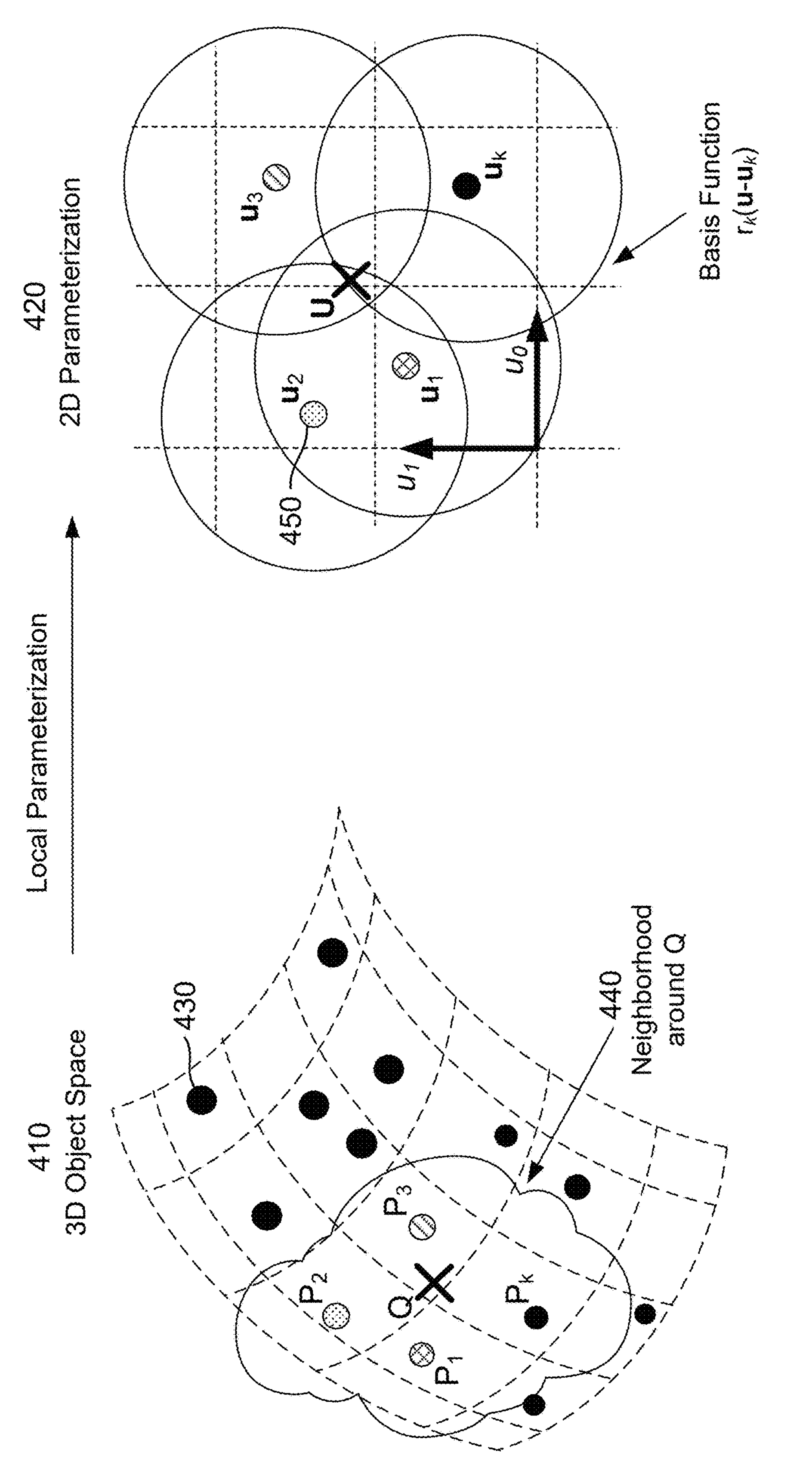
FIG. 4 illustrates an example of Gaussian Splatting, in accordance with some examples.

FIG. 4 illustrates an example of Gaussian splatting 400. The method of Gaussian Splatting may be employed when it is desired to produce a 2D image of a 3D object from a specific angle (e.g., camera pose) of the 3D object (e.g., where the 3D geometry of the 3D object is defined and known). For operation of the method of Gaussian Splatting, a continuous field can be represented by the composition of irregularly placed 3D Gaussian primitives. For example, many points can be modeled on the surface of the 3D object (e.g., the digital 3D object as shown by the 3D grid 410) as small Gaussian primitives (e.g., which can be simply referred to as Gaussians). The surface of the object can be defined as a combination of the Gaussians. The 3D Gaussians can be transferred into a 2D plane (e.g., 2D plane 420).

In FIG. 4, a 3D grid 410 (e.g., 3D object space) is shown to be laid across the surface of an object, where the surface has a curvature. Points 430 (e.g., points P1, P2, P3, and P4) can be sampled on the surface. At the center of each point 430 (e.g., points P1, P2, P3, and P4) located on the surface of the object, a Gaussian primitive (e.g., which may be referred to as a Gaussian) can be defined. The summation (or aggregation) of the Gaussians on the surface is shown by a neighborhood region 440 within the grid 410. The number of Gaussians can depend upon the size of the scene or the object. The surface of the object can be defined with the Gaussians.

Each Gaussian can have an associated u 450 (e.g., mean location of the associated point) and a covariance matrix Σ. The covariance matrix can define the orientation in 3D of the associated Gaussian. The two parameters μ and Σ can be used to define each Gaussian and are learnable. For efficiency, the covariance matrix Σ can be defined in a structured way with a rotation R and a scale S. The rotation R can be in the quaternion, and the scale S can be a diagonal. As such, the covariance matrix Σ can be efficiently decomposed into the scale S and the rotation R. The Gaussian also can be defined by color C (e.g., RGB) and transparency α. FIG. 4 also illustrates the transfer of the 3D Gaussians into a 2D plane 420 (e.g., a 2D parameterization). The Gaussians (e.g., in the form of elliptical shapes) are still present in the 2D plane 420.

In one or more examples, a set of 2D images can be captured (e.g., by one or more cameras or image sensors) from a scene (e.g., an indoor scene) from various different views (e.g., camera poses). The camera poses can be computed by running off-the-shelf camera pose estimation methods, such as a structure-from-motion (SfM) algorithm. Given the posed images and an initialized sparse point cloud, the systems and techniques can employ a Gaussian Splatting technique to simultaneously reconstruct the geometry and sparsify the planar surfaces in the scene.

Figure 5:
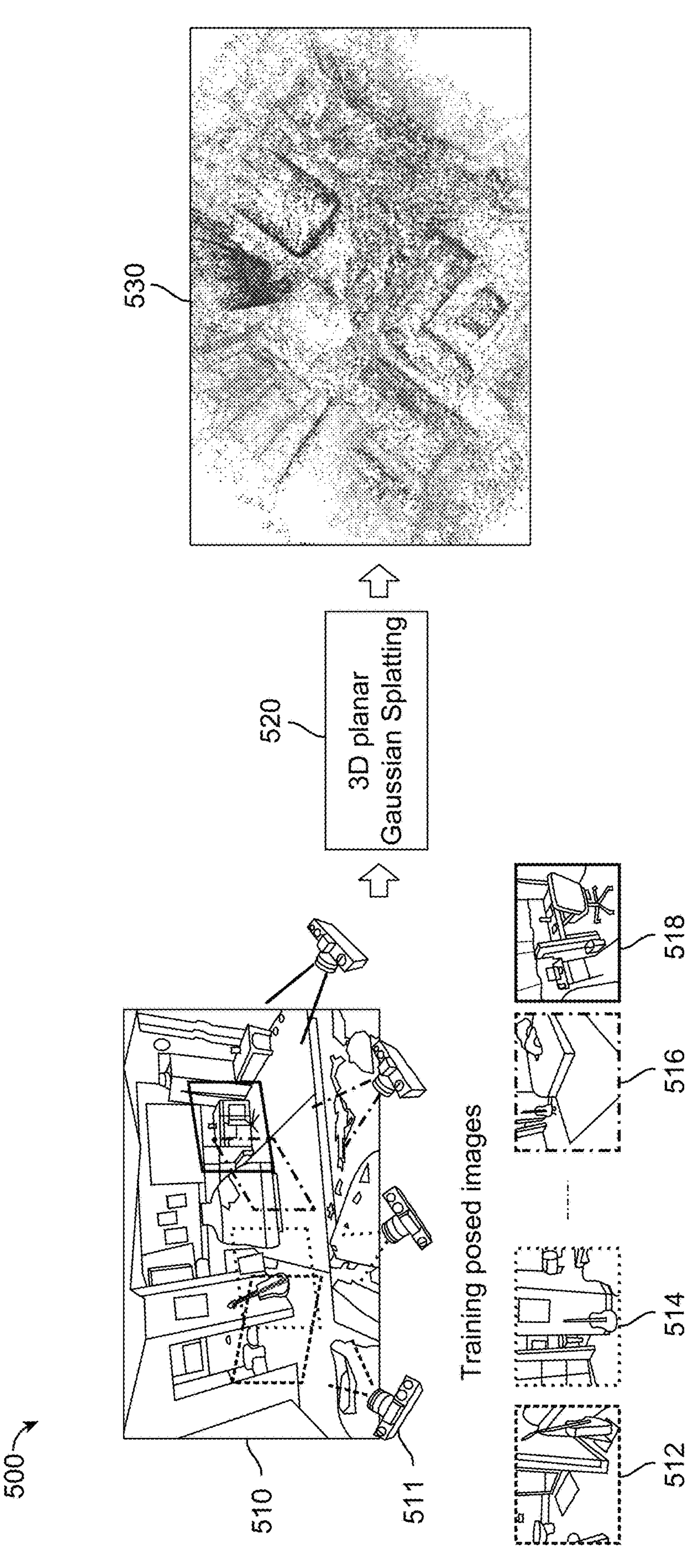
FIG. 5 illustrates an example of 3D Planar Gaussian Splatting, in accordance with some examples.

FIG. 5 illustrates an example of 3D Planar Gaussian Splatting 500. In FIG. 5, color images 512, 514, 516, 518 of a scene 510 taken from various different camera poses (e.g., of a camera 511) are shown. The images 512, 514, 516, 518 can be input into the 3D Planar Gaussian Splatting model (e.g., to perform 3D plane Gaussian Splatting 520) to generate a point cloud 530. FIG. 5 also shows an example of a generated point cloud 530 of the scene 510. The point cloud 530 is a 3D reconstruction (3DR) of the scene 510 plus planar parsing. As such, the point cloud 530 is augmented with (or classified to) the different planar surfaces of the scene 510. The different shadings (or colors) of the points within the point cloud 530 each indicate a different planar surface. As such, points with the same shading (or color) are located on the same planar surface.

Figure 6:
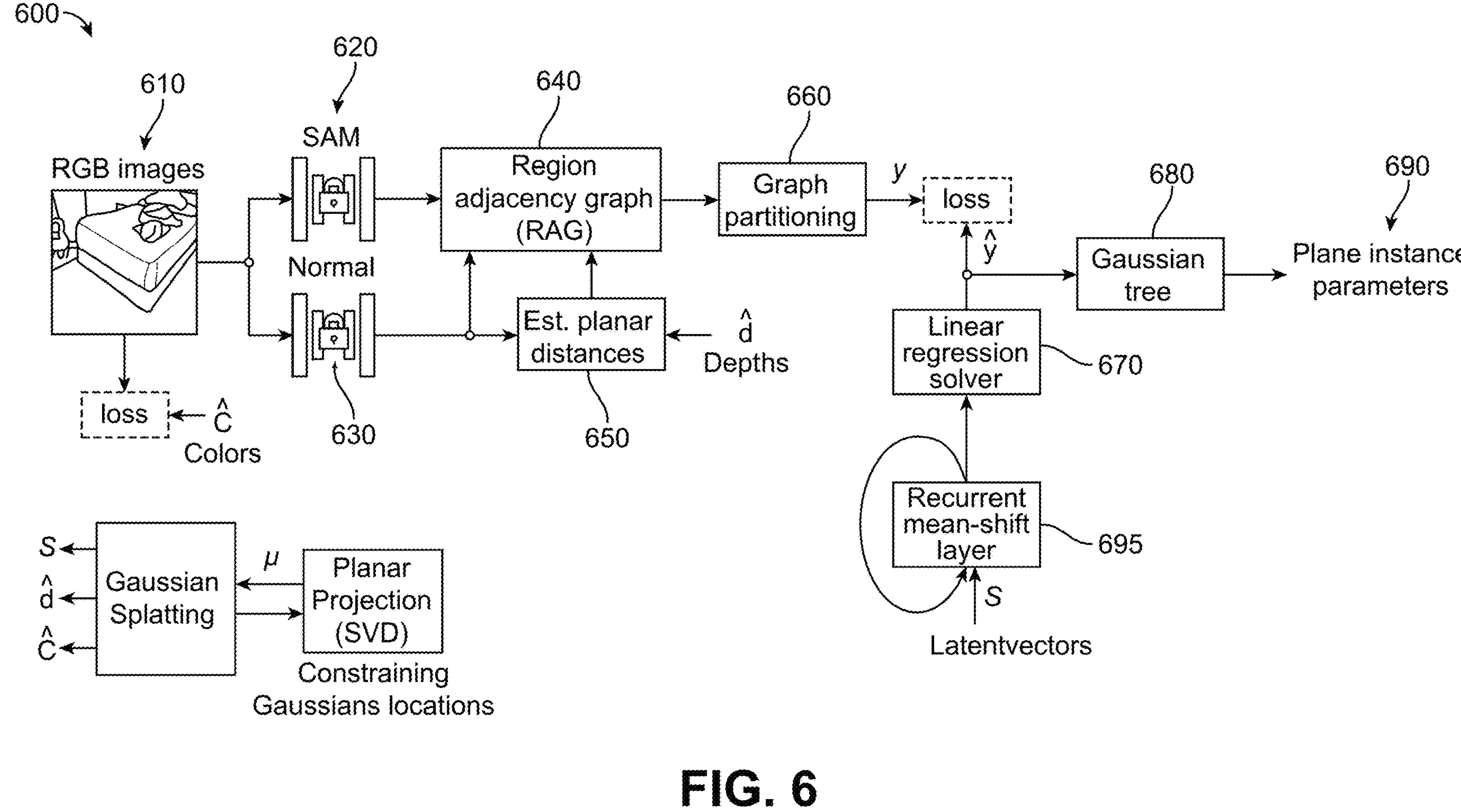
FIG. 6 illustrates an example of a process for Planar Gaussian Splatting, in accordance with some examples.

FIG. 6 illustrates an example of a process 600 for Planar Gaussian Splatting. In FIG. 6, during operation of the process 600 for Planar Gaussian Splatting, one or more processors can segment, using a first neural network (e.g., a SAM 620), one or more images 610 (e.g., RGB images) of a scene to determine a respective plurality of segments for each image 610 of the one or more images 610. In one or more examples, the SAM 620 is used to segment the images into segments (or regions).

The one or more processors can determine, using a second neural network (e.g., a normal neural network 630), a respective plurality of normal vectors (n) for each image 610 of the one or more images 610, where each normal vector of the respective plurality of normal vectors is orthogonal to a surface associated with a respective Gaussian primitive of a plurality of Gaussian primitives associated with an image 610 of the one or more images 610.

In one or more examples, the one or more processors can then generate a graph (e.g., a RAG 640) based on: each respective plurality of segments for each image 610, each respective plurality of normal vectors for each image 610, and a plurality of estimated planar distances ($d_p$) 650. In some examples, each segment of the plurality of segments can be represented as a node of a plurality of nodes in the graph (e.g., the RAG 640). In one or more examples, each node of the plurality of nodes can be connected by one or more edges to one or more adjacent nodes of the plurality of nodes.

The one or more processors can then partition (e.g., during graph partitioning 660), based on each respective plurality of normal vectors and the plurality of estimated planar distances 650, the graph to determine a plurality of indexes (y) associated with the plurality of Gaussian primitives. In one or more examples, the indexes may be pseudo labels. In some examples, the graph can be partitioned by removing at least one of the one or more edges.

The one or more processors can then assign, using linear regression (e.g., a linear regression solver 670), each descriptor(S) of a plurality of descriptors to an index of the plurality of indexes based on a respective weight (w). The one or more processors can merge, using a Gaussian tree 680, Gaussian primitives of the plurality of Gaussian primitives with associated indexes of the plurality of indexes that are similar to each other to generate plane instance parameters 690. In one or more examples, the one or more processors can update, using a recurrent mean shift (e.g., a recurrent mean-shift layer 695), the plurality of descriptors.

In one or more aspects, for the systems and techniques, the parameters of a Gaussian splatting field can be optimized to learn the geometry (e.g., 3D geometry). In addition to the standard parametrization of Gaussian primitives, each Gaussian can include a learnable normal vector and a plane-instance embedding vector. The optimization can involve learning such latent vectors to distinguish the Gaussians belonging to each individual 3D plane within the scene.

In one or more examples, for creating a pseudo label for parsing the planar surfaces, a pretrained SAM network can be used. The SAM network can segment 2D images (e.g., that are input into the SAM network) into several regions. A pretrained normal predictor network can also be utilized to estimate a pixel-level normal map of each training image.

In some examples, given the camera poses and their intrinsics parameters, the planar distance of each pixel can be computed in the camera view by:

$$p=(x,y,z)^T$$

where p can be a 3D point in the camera view coordinate system (e.g., where z can be the estimated depth).

A camera pinhole model can be represented as:

$$x = \frac{Z(u-u_0)}{f_x},\ y = \frac{Z(v-v_0)}{f_y}$$

where the camera pinhole model has a focal length ($f_x$, $f_y$) and a principal point ($u_0$, $v_0$).

A 3D plane can be computed by the 3D plane equation of:

$$n \cdot p + d_p = 0$$

where the normal vector $n=(n_1, n_2, n_3)^T$.

As such, the planar distance ($d_p$) can be driven as follows:

$$d_p = z * \left(-\frac{n_1}{f_x}u - \frac{n_2}{f_y}v + \frac{n_1}{f_x}u_0 + \frac{n_2}{f_y}v_0 - n_3\right)$$

As previously mentioned, for Gaussian Splatting (e.g., with reference to FIG. 4), the parameters μ, covariance matrix Σ, color C, and transparency α can be used to define each Gaussian primitive (e.g., Gaussian). The systems and techniques additionally use the parameters normal vector n and descriptor S to define each Gaussian primitive.

Figure 7:
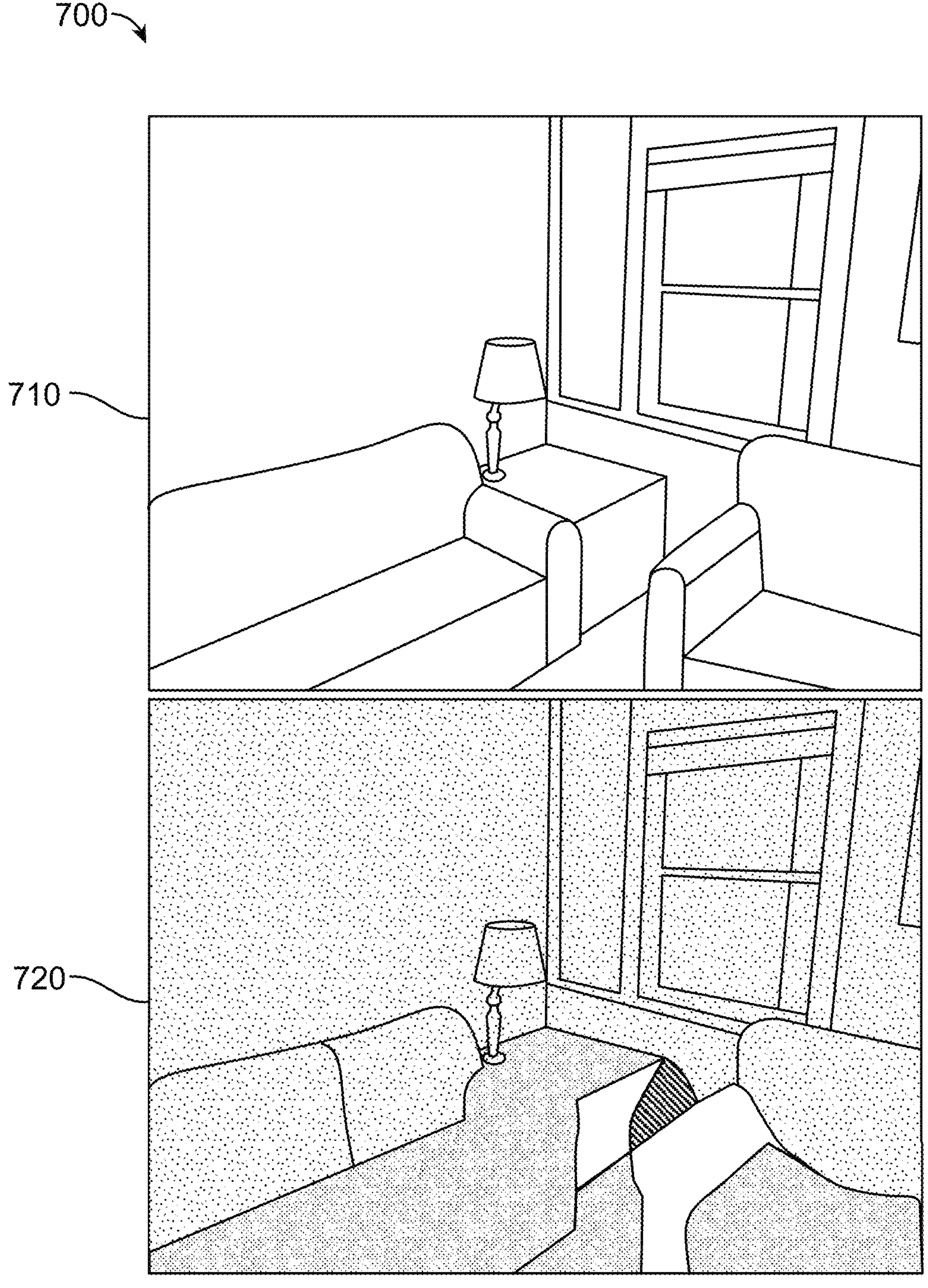
FIG. 7 illustrates an example of mapping planar distances of objects within an image, in accordance with some examples.

FIG. 7 illustrates an example 700 of mapping planar distances of objects within an image. FIG. 7 shows an example of a 2D image 710 (e.g., an RGB image) of a scene. FIG. 7 also shows an example of a planar distance map 720, where planes of objects with different distances are denoted by different shades (e.g., different shades of a color, such as blue).

In one or more aspects, a RAG can be constructed, where each node of the RAG can represent a segmented region extracted by SAM. Between every two neighbor regions in the segmented image, there will be an edge in the RAG. The mean of the normal vectors and the mean of planar distances per segment can be computed and assigned to the corresponding node in the RAG. The edges of the RAG can be suppressed based on the differences between their cosine distance of the normal vectors and the L1 loss measure of the planar distances. Each isolated sub-graph of the RAG can be assigned to a unique index, which can be used as a pseudo label for learning the embedding vector of the Gaussians.

As previously mentioned, in addition to the standard parameterization of each Gaussian primitive, a learnable vector ($s\in \mathbb{R}^d$) can be associated to each Gaussian. The vectors s can each have a norm equal to one ($\|s\|_2=1$), which can form a spherical embedding in $\mathbb{R}^d$.

Figure 8:
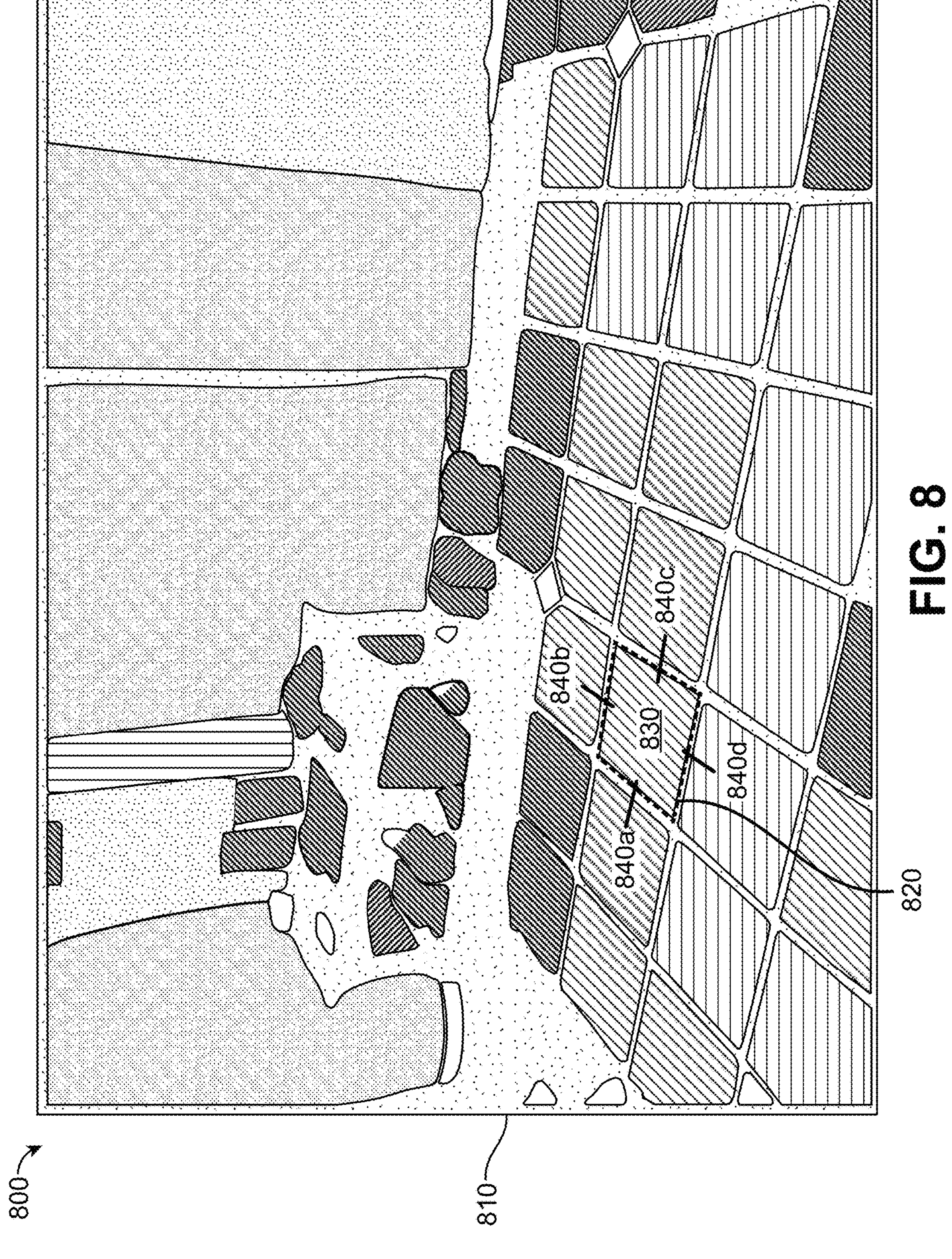
FIG. 8 illustrates an example of construction of a region adjacency graph (RAG), in accordance with some examples.

FIG. 8 illustrates an example of construction of a RAG 800. In FIG. 8, a segmentation map 810 (e.g., an output of a SAM) including a plurality of segments is shown. A grid 820 of a graph (e.g., a RAG) is shown to be overlaid onto a segment 830 (e.g., representing a tile of the floor) within the segmentation map 810. Each segment of the plurality of segments of the segmentation map 810 can be represented as a node of a plurality of nodes in the graph. Each node of the plurality of nodes can be connected by one or more edges to one or more adjacent nodes of the plurality of nodes. In FIG. 8, the node (e.g., representing the tile associated with the segment 830) of the graph is shown to be connected by edges 840*a*, 840*b*, 840*c*, 840*d* (e.g., four edges) to adjacent nodes (e.g., representing adjacent tiles). The graph can then be partitioned and/or at least one of the edges 840*a*, 840*b*, 840*c*, 840*d* can be removed (or dropped). For instance, in some cases, at least one of the edges 840*a*, 840*b*, 840*c*, 840*d* can be dropped (or removed) and the graph can be partitioned into two or more cliques, with each clique being assigned to a unique index. In some cases, each clique can represent a set of nodes belonging to one plane. In other cases, the whole graph (all image segments) has a unique index.

Figure 9:
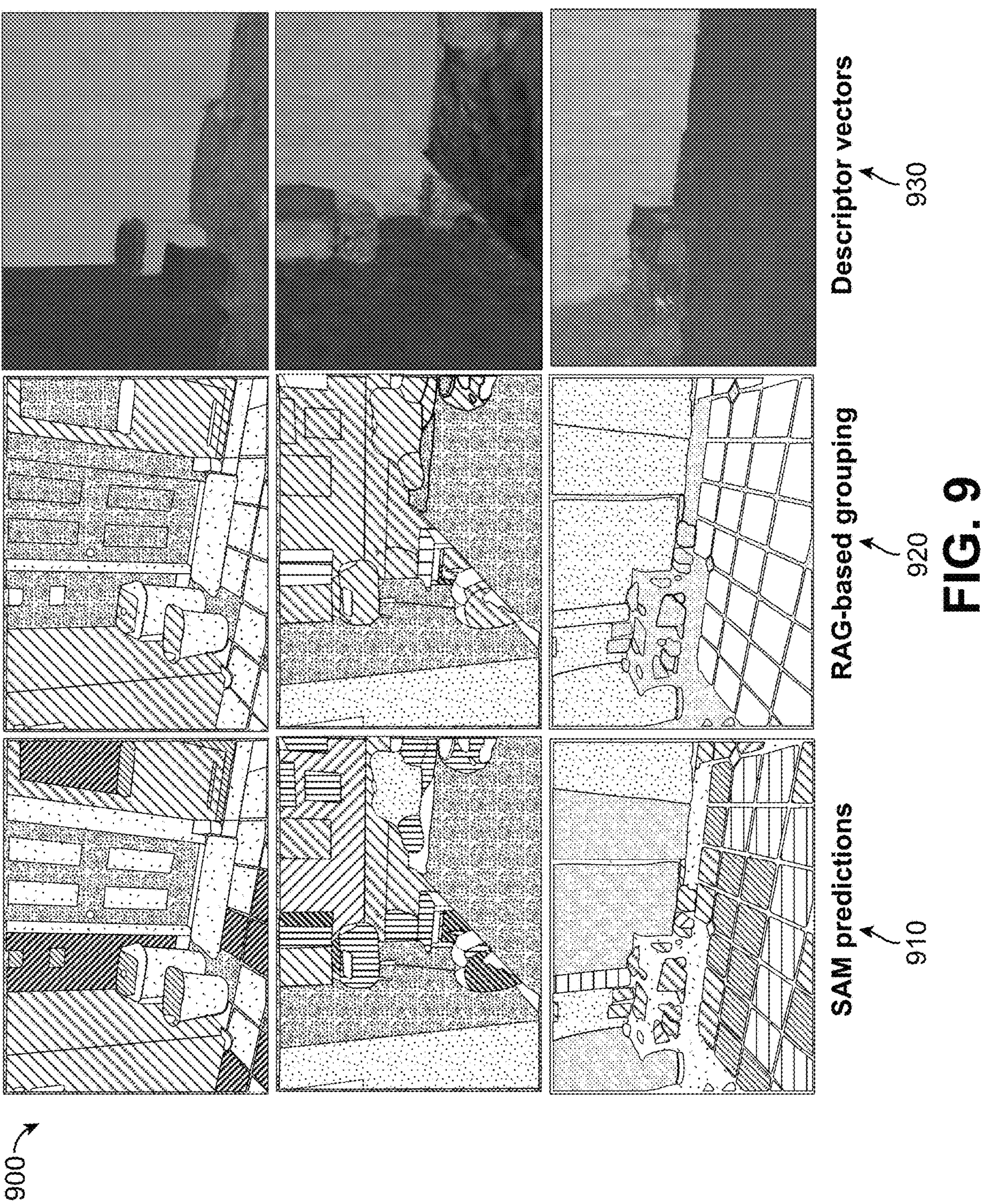
FIG. 9 illustrates examples of segment anything model (SAM) predictions, RAG-based grouping, and descriptor vectors, in accordance with some examples.

FIG. 9 illustrates examples 900 of SAM predictions 910, RAG-based grouping 920, and descriptor vectors 930. FIG. 9 shows examples of segmentation maps (e.g., outputs of a SAM, such as SAM predictions 910) including a plurality of segments, examples of partitioned graphs (e.g., partitioned RAGs, such as RAG-based grouping 920) including a plurality of indexes (y), and examples of descriptor maps (e.g., latent maps) including a plurality of descriptor vectors(S) 930.

In one or more aspects, predicting the pseudo labels of the RAG provides supervision on representation of embedding vectors. There may be no association between the RAG pseudo labels across different images. Moreover, the size of the label set can be variable across images. Therefore, for each individual training image, a linear regression solver (e.g., linear regression solver 670 of FIG. 6) can be used to estimate the pseudo labels ŷ, given the vector s. In one or more examples, the regression weights and biases can be given in a closed-form expression as:

$$[s\,|\,1] \cdot w = y \rightarrow w = \left(s^T \cdot s\right)^{-1} \cdot s^T \cdot y$$

where, vector y can be a one-hot vector of pseudo labels. The estimated parameter w can be considered a tuned predictor, and the prediction of pseudo labels can be obtained by $\hat{y}=[s|1]\cdot w$, which can then be used for evaluating the error $\|y-\hat{y}\|_1$ (e.g., a loss) for the gradient back-propagation.

Figure 10:
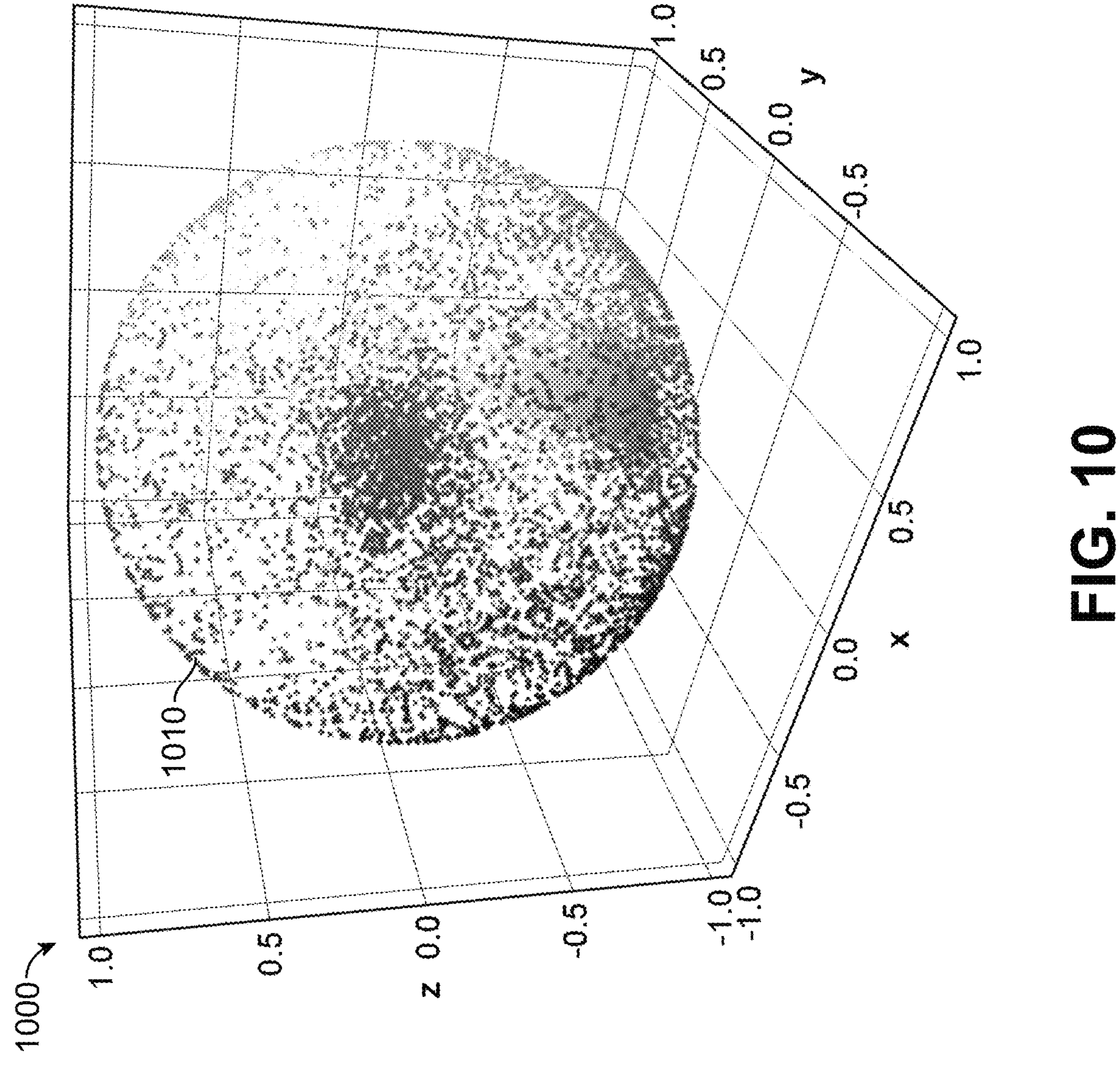
FIG. 10 illustrates a graph showing examples of clusters of points on a sphere, in accordance with some examples.

To encourage forming a sparable representation of planes on a spherical embedding, a recurrent mean-shift (e.g., the recurrent mean-shift layer 695 of FIG. 6) can be applied to the embedding vectors s as:

$$S \leftarrow S \cdot \left(\eta \cdot K \cdot D^{-1} + (1-\eta) \cdot I\right)$$

where $K=e(\gamma^{S^T S})$ can be a vom Mises-Fisher (vMF) distribution on a sphere, and $D=\mathrm{diag}(K^T \cdot 1)$ can denote a diagonal matrix. Unlike standard mean-shift mode finding, the matrix K can be recomputed at each iteration. The hyperparameter γ can be the kernel bandwidth and can determine the smoothness of the kernel density estimation. The hyperparameter η can control the rate of dynamic/updates. FIG. 10 illustrates a graph 1000 (e.g., a 3D graph) showing examples of clusters of points (e.g., associated with S vectors) on a sphere 1010. In FIG. 10, the points of the S vectors are shown to reside on the sphere 1010 in 3D. After running a recurrent mean-shift (e.g., at every iteration or few iterations), similar S vectors will be forced to cluster together, as is shown in FIG. 10.

In one or more aspects, during training, for every input image, five different images can be rendered from the Gaussians field. These images can include color, depth, normal (e.g., normal vectors), a planar distance map, and a latent map (e.g., a descriptor map). Supervision can be applied on the color and normal maps by comparing against a camera RGB image and a normal prediction network. For learning descriptors, merged SAM pseudo labels can be utilized.

In one or more examples, if the Gaussians are positioned exactly on a 3D plane, processing the rendered 2D images can result similarly if they are processed in the 3D field, otherwise some Gaussians may have received weak supervision due to occlusion and alpha blending. As such, the centers of Gaussians can be forced to be close to the surface of local 3D planes. This forcing can be done by projecting the Gaussians' center positions on the local planes (e.g., computed by singular value decomposition (SVD)) every N number of iterations.

Figure 11:
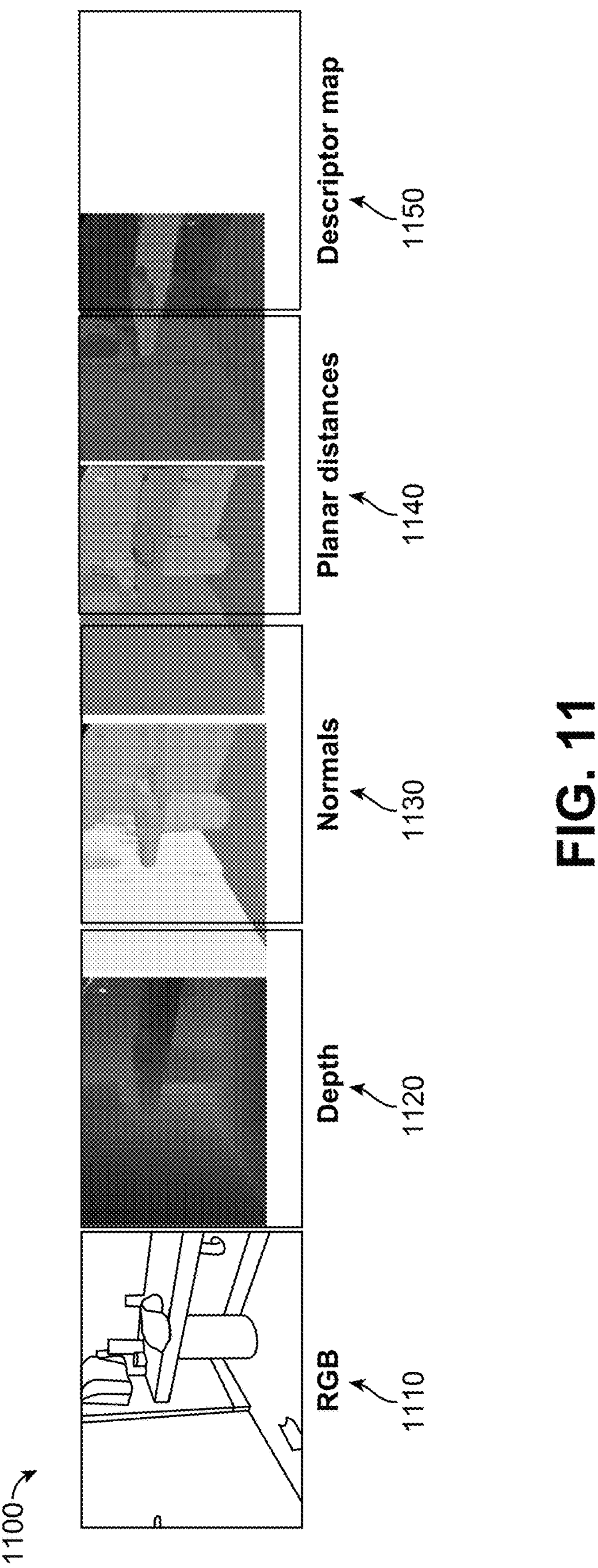
FIG. 11 illustrates an example of a set of rendered images from a 3D Gaussian field, in accordance with some examples.

FIG. 11 illustrates an example of a set of rendered images 1100 from a 3D Gaussian field. In particular, FIG. 11 shows five different images of a scene that can be rendered from a Gaussian field. FIG. 11 shows a color image 1110 (e.g., an RGB image), a depth map 1120 including a plurality of depths, a normal map 1130 including a plurality of normal vectors, a planar distance map 1140 including a plurality of planar distances, and a descriptor map 1150 including a plurality of descriptors.

In one or more aspects, to identify individual 3D planes in a scene, a tree-based Gaussian merging can be employed. In one or more examples, given each point as the center of a Gaussian primitive and their associated normal (e.g., normal vector) and descriptor, the Gaussians can be combined together into small local clusters and a Gaussian distribution can be fitted to their center positions (e.g., which may be referred to as Gaussian blobs).

For example, optimizing the parameters of a Gaussian field may result in a spatial distribution of Gaussian point(s) close to the surface of objects in the scene. For decomposing the scene into distinct 3D planes, a probabilistic approach can be used for modeling the scene as a compositional modeling in the form of a Gaussian tree. The Gaussian field can be modeled as a GMM represented by a GMM-Tree, which can be built recursively from small GMMs at the leaf nodes to the root node representing the entire scene. In the defined GMM-tree, the child nodes of the root can represent individual 3D plane instances. Each parent in the node (except the root) can specify a Gaussian distribution Gp(μp, Σp) in 3D space, encompassing all centers (μ) of its child. The structure of the tree may be formed in a bottom-up construction. Since each node specifies a Gaussian distribution, merging two nodes may be equivalent to merging their Gaussian distributions. For two Gaussian distributions, the merging may be performed as follows:

$$\textstyle\sum_p = \sum_j \cdot \left(\sum_i + \sum_j\right)^{-1} \sum_i$$

$$\mu_p = \textstyle\sum_j \cdot \left(\sum_i + \sum_j\right)^{-1} \mu_i + \sum_i \cdot \left(\sum_i + \sum_j\right)^{-1} \cdot \mu_j$$

where ($\mu_p$, $\Sigma_p$) specifies the Gaussian parameters of the parent node. The merging criteria are based on both the Bhattacharya distance ($D_B$) between their respective Gaussian distributions and the cosine distance between the descriptors of the nodes. For two multivariate Gaussian distributions ($G_i$, $G_j$), the following can be computed:

$$D_B(G_i, G_j) = \frac{1}{8}(\mu_i - \mu_j)^T \textstyle\sum^{-1} (\mu_i - \mu_j) + \frac{1}{2}\ln\left(\frac{\det \sum}{\sqrt{\det \sum_i \det \sum_j}}\right)$$

where $$\textstyle\sum = \frac{\sum_i + \sum_j}{2}.$$

In some cases, the tree structure can be formed by merging every two nodes, which their descriptors are similar and their Bhattacharya distance is lower than a predefined threshold.

In some cases, the Gaussian blobs with a high likelihood value can be combined together to form a larger multivariate Gaussian distribution, which can be specified by ($\mu_p$, $\Sigma_p$).

FIG. 12 illustrates an example of tree-based Gaussian merging 1200. FIG. 12, shows a gray plane 1210 (e.g., representing a floor of a room) and a cube 1220 (e.g., representing an object in the room). The cube 1220 has a certain descriptor (e.g., denoted with descriptors 1230). A part of the floor (e.g., denoted with descriptors 1240) has some variation with another part of the floor (e.g., denoted with descriptors 1250). Similar descriptors (e.g., descriptors denoted with the same shading or color) are shown to be merged together. The descriptors 1240 and the descriptors 1250 can be merged together to form a larger Gaussian (e.g., denoted by a dashed oval 1260).

FIG. 12 also shows an example of a Gaussian tree 1270. For the construction of the Gaussian tree 1270, similar descriptors (e.g., descriptors with similar shadings or colors) located at the bottom of the tree can be aggregated together to form a single similar descriptor to define the scene.

Figure 13:
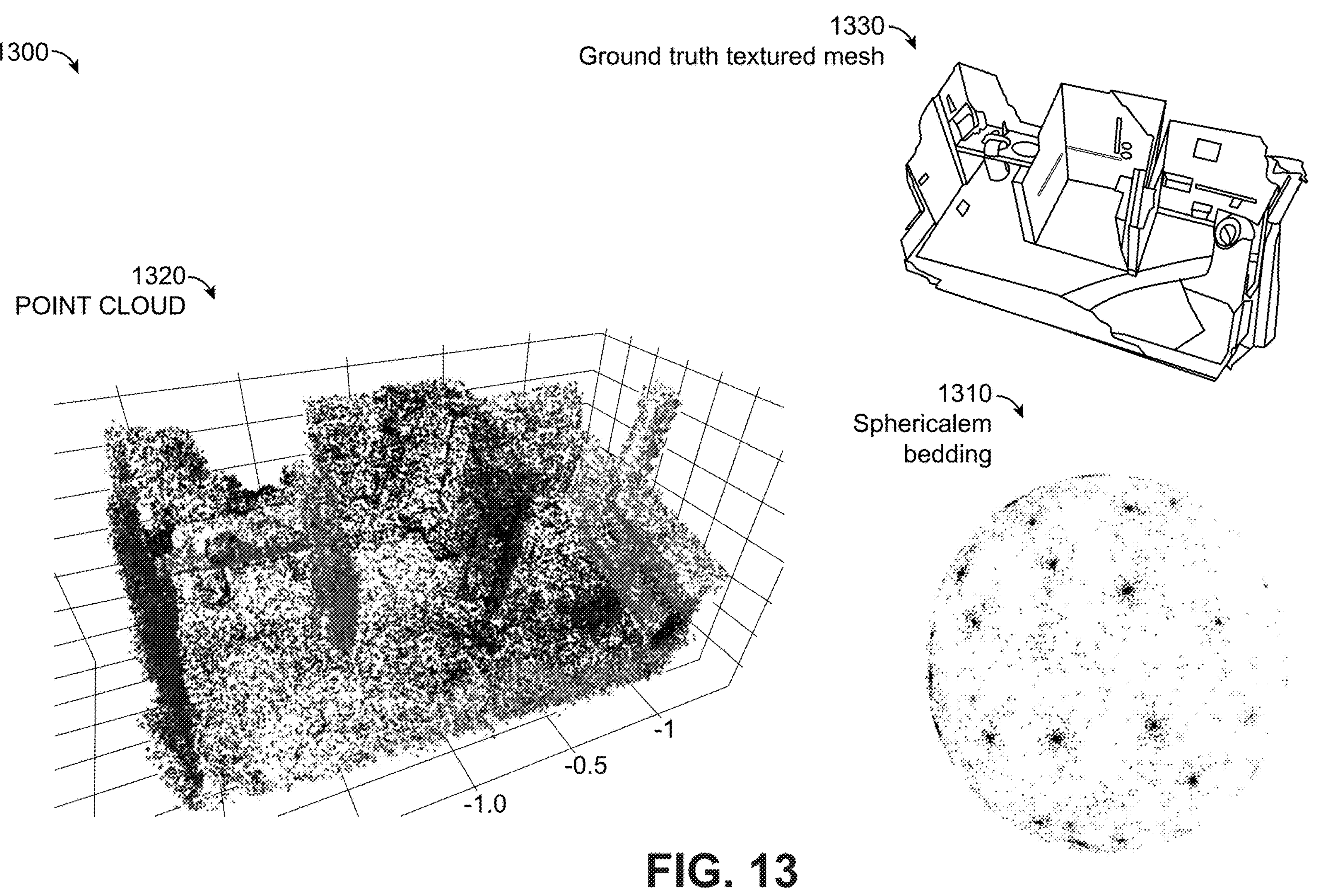
FIG. 13 illustrates an example of generation of a spherical embedding representing plane instances of a scene, in accordance with some examples.

FIG. 13 illustrates an example of generation 1300 of a spherical embedding 1310 representing plane instances of a scene. FIG. 13 shows a point cloud 1320 of a scene with different descriptors, which are each denoted by a different shading (or color). The different shadings (or colors) can encode a Gaussian latent space (e.g., including the point cloud 1320) used for planar parsing. FIG. 13 also shows a result of a spherical embedding 1310 by using a recurrent mean-shift. In the sphere, the similar descriptor vectors are shown to be merged together into clusters. FIG. 13 additionally shows the corresponding ground truth textured mesh 1330 for the scene.

Figure 14:
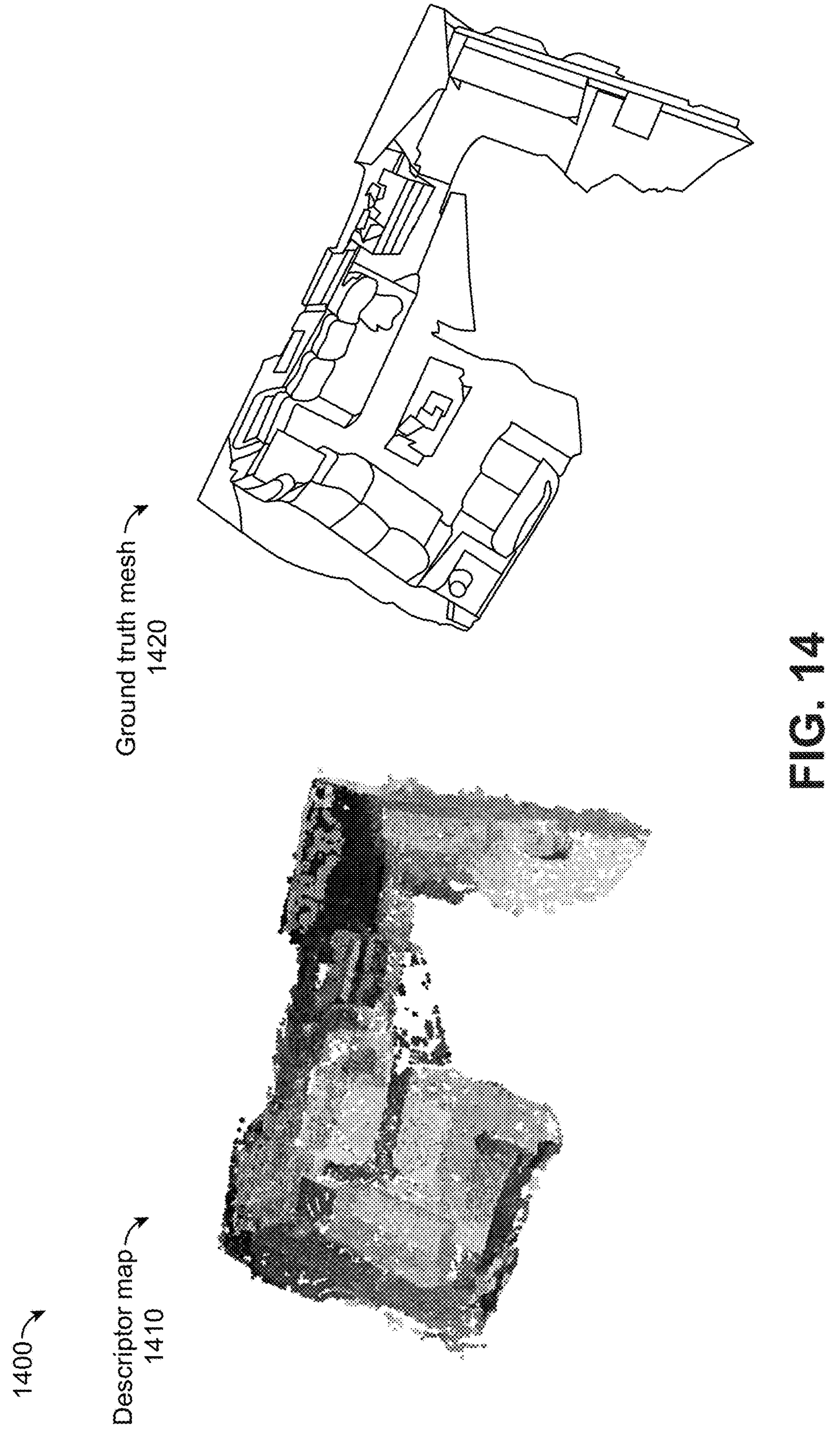
FIG. 14 illustrates an example of a comparison of estimated Gaussian plane descriptors with a ground truth of the scene, in accordance with some examples.

FIG. 14 illustrates an example of a comparison 1400 of estimated Gaussian plane descriptors with a ground truth of the scene. FIG. 14 shows a descriptor map 1410 of a scene including estimated Gaussian plane descriptors, where similar descriptors are denoted with a same shading (or color). FIG. 14 also shows the corresponding ground truth mesh 1420 for the scene.

In one or more aspects, analyzing 3D planar surfaces in indoor settings using multi-view posed monocular video can unlock diverse applications, including augmented reality, virtual reality, robot navigation, and 3D interior modeling. This approach can leverage the fact that most man-made environments feature predominantly planar surfaces. By approximating scene geometry with a collection of basic planar shapes, a compact and efficient representation that facilitates interaction with the physical space can be achieved.

While recent deep learning methods typically treat 3D planar surface understanding as supervised learning tasks, relying on annotations of either 2D planes or 3D structures, these approaches face limitations. While utilizing large-scale plane annotations eases the training process, acquiring high-quality specialized annotations can be an expensive endeavor. Furthermore, these models struggle to generalize unseen scenes or scenes captured with different imaging sensors, as known as a domain-shift issue. Therefore, leveraging a foundation vision model, such as the SAM, capable of learning from various datasets and diverse sensor data, can be crucial for a robust planar understanding. In this direction, the systems and techniques provide a method for integrating 2D image segments, obtained by SAM, which can generalize a zero-shot to unfamiliar objects. The integration can involve a multi-view consistency between SAM pseudo labels, partially visible in every video frame, and can concurrently learn the 3D geometry and parse the 3D geometry into 3D planes.

Recent advancements in differentiable rendering typically enable 3D geometry reconstruction solely from multi-view 2D images, thereby eliminating the need for a 3D ground truth. While methods like Neural Radiance Fields (NeRF) and their successors can achieve impressive Novel View Synthesis (NVS) quality, extracting explicit planar surfaces from their implicit representations can remain a challenge. Specifically, volume-based approaches often rely on computationally expensive steps, like ray marching and density field prediction for implicit surface modeling, followed by Marching Cubes for surface extraction and Sequential Random Sample Consensus (RANSAC) for plane detection. These steps can require careful tuning of numerous hyper-parameters (e.g., in RANSAC), thereby adding complexity and hindering a broader application.

Compared to implicit methods, explicit neural representations (e.g., explicit methods) can offer several advantages. For example, explicit methods can allow for direct optimization of a volumetric tetrahedral mesh or point cloud on the geometric primitives themselves. This direct optimization can make it easier to constrain the reconstructed surfaces (e.g., constrain to be locally planar). However, existing explicit methods are generally primarily developed for NVS and require additional steps for smooth or planar reconstruction.

In one or more aspects, the systems and techniques provide a method that adapts Gaussian Splatting, not for NVS, but specifically for planar reconstruction and identification of 3D plane instances in a scene. In one or more examples, the systems and techniques introduce Planar Gaussian Splatting, which provides a framework for 3D planar surface reconstruction and parsing. Planar Gaussian Splatting provides a first scene-level 3D planar reconstruction and parsing using explicit rendering. Planar Gaussian Splatting can achieve 3D plane reconstruction and instance segmentation by merging a 2D mask of SAM through a RAG and posing consistency across multi-view images. As such, only posed RGB images are needed, thereby eliminating the need for a 3D ground truth or a planar ground truth. Planar Gaussian Splatting can achieve state-of-the-art performance for 3D planar reconstruction, while not requiring the use of 3D ground truth data. Planar Gaussian Splatting can seamlessly handle new test scenes, whereas pre-trained models typically suffer significant performance degradation due to domain disparities.

Currently, there are several works that have looked into planar reconstruction from a single RGB image via deep learning (e.g., referred to as single-view planar reconstruction). Some of these works propose Convolutional Neural Network-based (CNN-based) models, which are trained to predict both segmentation and 3D plane parameters. However, these methods have a prescribed maximum number of planes within an image, which can limit the applicability of the models. Some other methods for single-view planar reconstruction can handle any number of planes. Recently, one of these methods (e.g., PlaneTR method) leverages transformers to consider context information and geometric cues in a sequence-to-sequence way.

Multi-view reconstruction (e.g., multi-view planar reconstruction) utilizes multiple images, which provide richer geometric information than by just using a single image (e.g., as does single-view planar reconstruction). Currently, there are several works for multi-planar view construction that share a common two-stage approach, which includes local plane detection and plane parameter estimation. More recently, one method for multi-view planar reconstruction (e.g., PlanarRecon method) proposes to detect planes from video fragments and combine the detected planes to create a comprehensive global planar reconstruction, which can then be supervised using 3D ground-truth planes during training. In contrast, the disclosed systems and techniques provide a multi-view 3D planar surface reconstruction method without the need for 2D or 3D plane annotations.

Currently, one existing method (e.g., 3D Gaussian Splatting for real-time radiance field rendering, referred to as 3DGS) models the scene as a set of 3D Gaussians, which is an explicit form of representation, in contrast to the implicit representation used in NeRFs. Each Gaussian is characterized by a covariance matrix $\Sigma$ and a center (mean) point $\mu$, such that:

$$G(x) = e^{-\frac{1}{2}(x-\mu)^T \Sigma^{-1}(x-\mu)} \quad \text{(equation 1)}$$

The means of the 3D Gaussians are initialized by a set of a sparse point cloud (e.g., randomly or obtained from SfM). Each Gaussian is parameterized as the following parameters: (a) a center position $\mu \in \mathbb{R}^3$, (b) a covariance matrix that has a form of $\Sigma$+RSS$^T$R$^T$ computed from scaling s ∈ $\mathbb{R}^3$ and rotation factors r $\mathbb{R}^4$ (in quaternion rotation), (c) an opacity α∈ $\mathbb{R}$, and (d) a spherical harmonics (SH) coefficient c ∈ $\mathbb{R}^k$ (where k represents the degree of SH) that represents the color. In order to optimize the parameters of 3D Gaussians of the present the scene, a differentiable rendering at the location of a given camera view (W) is performed. As proposed in the method (e.g., 3DGS), the rendering involves the process of splatting the Gaussian into an image plane, which can be efficiently achieved by approximating the projection of a 3D Gaussian along a depth dimension into pixel coordinates. Given a viewing transform W, the 2D covariance matrix in camera coordinates can be expressed by $\Sigma^{2D}$=JW$\Sigma$W$^T$J$^T$, where J is the Jocobbian of the affine approximation of the projection transformation. For each pixel, the color of all Gaussians is computed using equation 1, and the rendering is performed by alpha-blending N depth-ordered points that overlap the pixel by:

$$C_{pix} = \sum_i^N c_i \alpha_i \prod_j^{i-1} (1-\alpha_j) \quad \text{(equation 2)}$$

where $\alpha_i$ is a learnable per point opacity, and $c_i$ is the RGB color obtained by SH coefficients.

In one or more aspects, for the disclosed systems and techniques, to perform planar reconstruction (in addition to rendering the color field as in equation 2 and minimizing the photometric loss), three other additional fields can be rendered, which can include the surface normal field, the depth field, and the plane-instance latent field, as are detailed as follows.

The extended parametrization of the Gaussian primitives, by the systems and techniques, introduces a normal vector n ∈ $\mathbb{R}^3$ and a descriptor vector z ∈ $\mathbb{R}^k$ (e.g., k=3). The normal n can represent the normal vector of the surface at the location of each Gaussian, and the vector z can be a descriptor, which identifies different 3D plane-instances in the scene.

To optimize the normal parameters of the Gaussians (e.g., the Gaussian primitives), the systems and techniques can employ a pre-trained network that can predict a normal map of 2D images. Specifically, the systems and techniques can utilize an Ominidata model (e.g., a scalable pipeline for making multi-task mid-level vision datasets from 3D scans) for normal prediction in the training images. To constrain the surface planarity reconstruction and segment the scene into plane instances, a SAM can be employed. A SAM can segment the input 2D images into object parts. The systems and techniques can prompt the SAM model with a grid of points (e.g., a 32×32 regular grid of points). For each point in the grid, the SAM can predict a set of masks that may correspond to valid objects. The SAM can incorporate an ambiguity-aware modeling (e.g., where, if a point lies on a part or subpart, the SAM may return the subpart, the part, or the entire object).

The systems and techniques can then obtain masks from the SAM to apply two constraints to all of the Gaussians (e.g., Gaussian primitives) corresponding to a specific mask region. These two constraints may be (1) a local planarity (e.g., where a local planarity can be enforced on the location of Gaussians), and (2) a descriptor vector learning (e.g., where a similar descriptor vector s can be learned for all Gaussians to distinguish them from other Gaussians). However, directly using the masks generated by the SAM for these purposes may not be feasible (e.g., due to a couple of reasons). For example, the associations between the obtained masks across different views are unknown. Each planar surface in the scene can be represented by multiple masks (e.g., one mask per tile on the floor). Therefore, assigning a global target index (or label) to each mask and comparing the index (or label) against the model predictions, as is common in standard supervised learning, may not be viable.

In one or more examples, a RAG can be constructed to merge masks belonging to individual planes in the camera view. In this graph, each node can represent a segmented region (e.g., a mask), and edges can connect nodes, whose corresponding masks are neighbors in the segmented image. By cutting the edges that connect nodes from two distinct planes, cliques may be obtained, where each clique can represent a set of nodes belonging to one plane.

However, relying solely on the dissimilarity of normal vectors between neighboring nodes can be inadequate for cutting such edges because there may be distinct planes with similar normal vectors, but the distinct planes may have different depths relative to the camera. To address this limitation, the average planar distance for each segment's pixels can be computed and then assigned to the RAG nodes.

In one or more examples, the planar distances may be computed as follows. Using a pinhole camera model and camera intrinsic parameters (e.g., focal lengths ($f_x$, $f_y$) and the principal point ($u_0$, $v_0$)), a pixel in a 2D image p=(u, v)$^T$ can be mapped to the corresponding 3D point P=(X, Y, Z)$^T$ using a depth value. The depth values can be obtained by rendering a depth map from the Gaussian fields. Assuming that every pixel p belongs to one planar surface in the scene, the point p and the plane can satisfy the point-normal equation: $\bar{n}\cdot P+d_p=0$, where $\bar{n}=(n_1, n_2, n_3)$ T is the predicted normal vector. As such, the planar distance (PD) of every pixel may be given as follows:

$$d_p = d_{(u,v)} \cdot \left( \frac{n_1}{f_x}(u_0 - u) + \frac{n_2}{f_y}(v_0 - v) - n_3 \right) \quad \text{(equation 3)}$$

Figure 15:
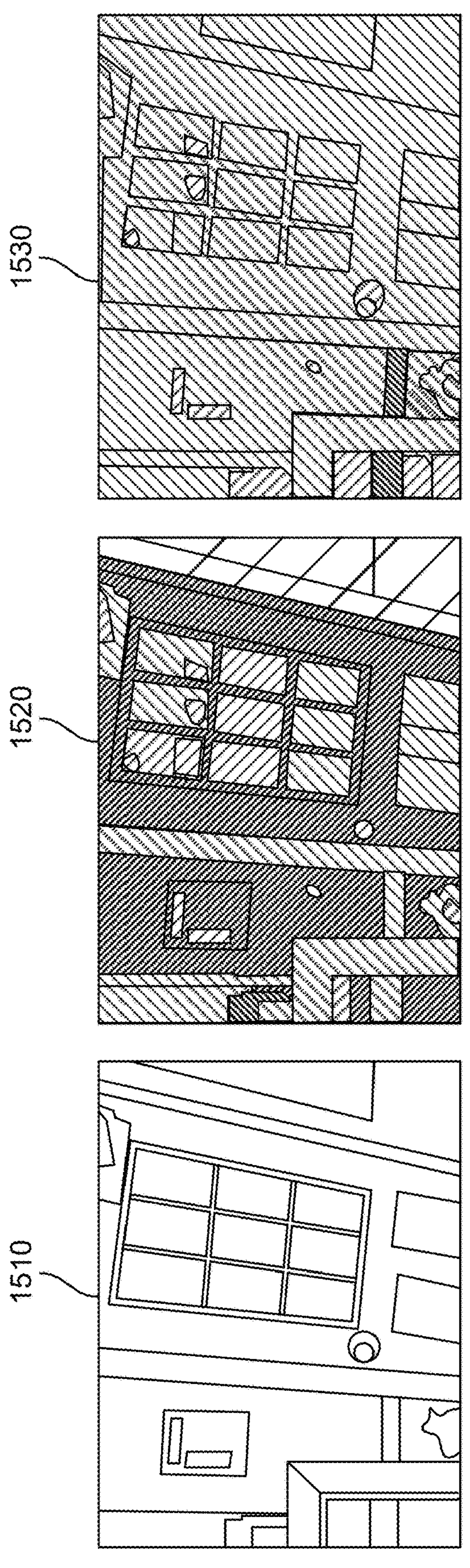
FIG. 15 is a diagram illustrating examples of merging Segment Anything Model (SAM) proposal regions by a Region Adjacency Graph (RAG), in accordance with some examples.

$d_{(u,v)}$ is the depth image at position (u,v) of image, obtained by rendering the dpth field of Gaussian primitives. The $\bar{n}$ and $d_p$ are view dependent. In each iteration of optimization, rendering the depth map and normal map from the Gaussian field can result in computing a PD map by using equation 3. The mean of the PD values and the normal vectors inside each image segment can be assigned to the corresponding node in the RAG. By applying predefined thresholds on the normal values and the PD values of nodes, the edges of graph can be cut. FIG. 15 is a diagram illustrating examples 1500 of merging SAM proposal regions by a RAG. FIG. 15 shows a color RBG image 1510 of a scene, SAM segments 1520 (e.g., the output of SAM), and merged regions 1530 by partitioning the RAG.

As mentioned earlier, for learning a representation for each Gaussian (e.g., Gaussian primitive) to identify distinct planes within the scene, an additional parameter z can be introduced. The vector z can be constrained have a norm equal to one ($|z\|_2$=1) to form a spherical embedding. Optimizing the z by using mask indices is not straightforward because the corresponding masks between images are unknown and the number of masks is variable across the images (e.g., different images have different numbers of masks). To address these issues, a linear regression solver with a closed-form expression can be used for predicting the indices of merged SAM masks for a given vector z. Utilizing efficient 3DGS rendering, first an image can be rendered, where each pixel can represent the z vector of the Gaussian field in a given camera view. Then, a linear layer (e.g., obtained by the linear regression solver) can map the rendered descriptor image into one-hot vector y, encoding the target mask indices as follows:

$$y = [z \mid 1] \cdot w \rightarrow \hat{w} = (z^T \cdot z)^{-1} \cdot z^T \cdot y \quad \text{(equation 4)}$$

$$\mathcal{L}_{seg} = \|y - \hat{y}\|_1 \quad \text{(equation 5)}$$

where the loss term can be computed by comparing the predictions $\hat{y}=[z|1]\cdot\hat{w}$ against the targets labels. Equation 4 optimizes the latent rendered map and equivalently the Gaussian's s parameters. The linear regression solver in equation 4 can be recomputed per given camera view, and the length of one-hot vector y can be variable per image (e.g., depending upon the number of produced masks after merging the SAM segments).

Figure 16:
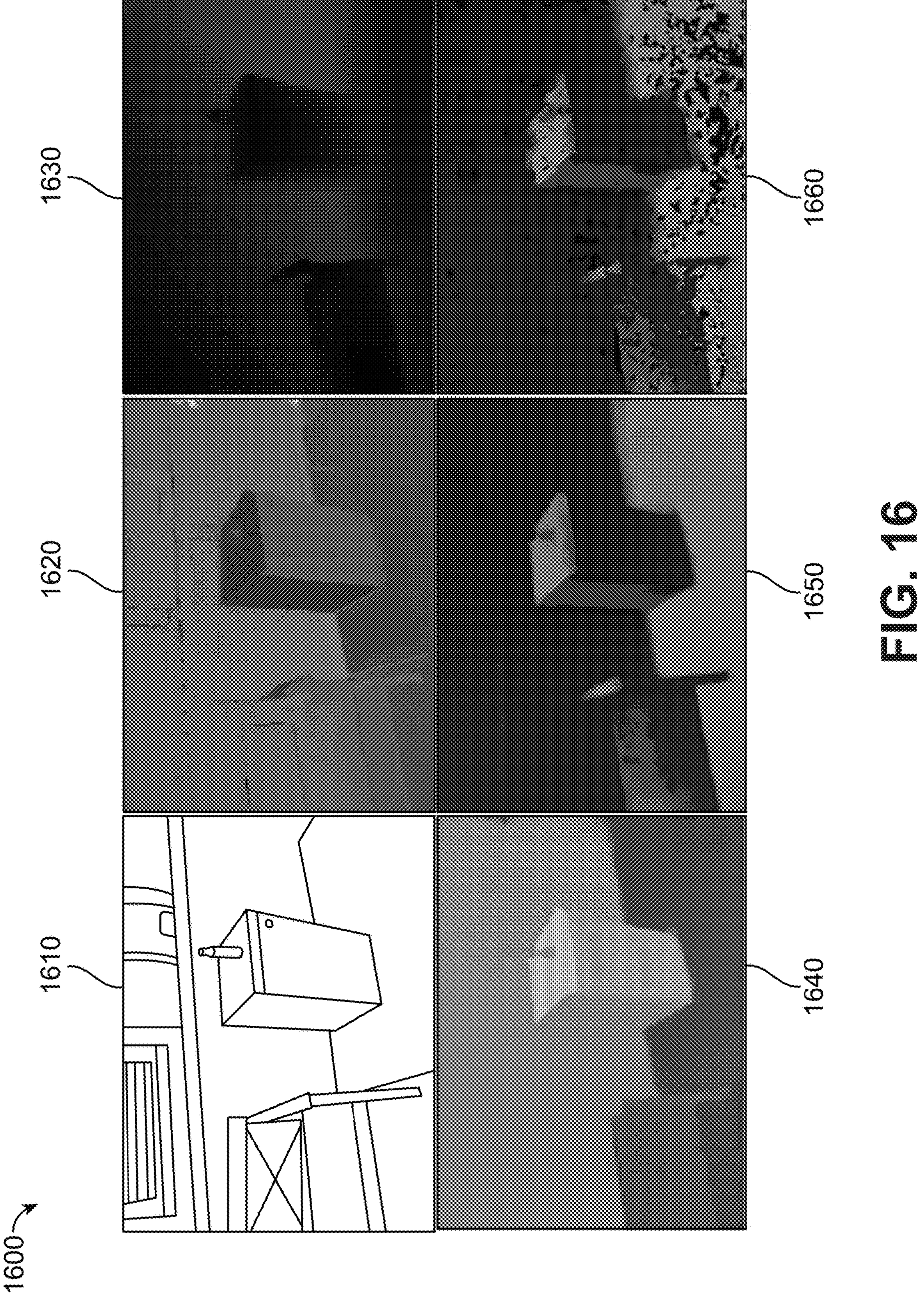
FIG. 16 is a diagram illustrating examples of rendering different fields, including color, planar distance, depth, plane instance, and normal maps, in accordance with some examples.

FIG. 16 is a diagram illustrating examples 1600 of rendering different fields. In one or more examples, the different fields can include color 1610, planar distance 1620, depth 1630, plane instance 1640, and/or normal maps 1650, 1660.

While optimizing the z vectors of the Gaussians using equation 4 can obtain a discriminative representation to identify the Gaussians that belong to distinct 3D plane instances, to maintain such a separability in the global context (e.g., across surfaces where never seen jointly in any camera view), a recurrent mean-shift update can be applied on the entire Gaussian field. In the matrix form, the recurrent mean-shift update can be specified as:

$$S \leftarrow S \cdot (\eta \cdot K \cdot D^{-1} + (1-\eta) \cdot I) \quad \text{(equation 6)}$$

where $K=e^{(\gamma S^T S)}$ can be a vMF distribution on a sphere, and D=diag ($K^T \cdot I$) can denote a diagonal matrix. The hyperparameter η can be the rate of update, and y can be the kernel bandwidth, which determines the smoothness of a kernel density estimation. In practice, updates on z can be run, as specified in equation 6, for a few iterations at every N iteration of training. Since the number of Gaussians can be large, an efficient way of computing equation 6 on a random seed can be employed.

In one or more aspects, the 3DGS method, through rendering the Gaussian field, can generate photorealistic images that closely resemble the camera images. While this approach excels in NVS tasks, this approach can become problematic when the primary objective is to learn the scene's geometry. The rendering pipeline can involve alpha-blending aggregation of Gaussians, which are depth-sorted relative to the camera. However, this process can result in occluded Gaussians receiving weak supervision, leading to suboptimal parameter optimization. Although this issue is not critical for rendering RGB images, this issue poses challenges when learning accurate normal vectors or surface descriptors encoded in parametrized Gaussians. For example, the alpha-blending mechanism can render the normal map of a 2D surface, closely resembling the ground truth, but not all Gaussians on the surface have adapted to the corresponding normal vectors.

To tackle this issue and optimize all of the introduced parameters of the Gaussian instances, for local planar alignment, the surfaces can be represented by tiny local planes at the location of each Gaussian. The center of all neighboring Gaussians can be forced to lie on such local planes. To apply the planarity constraint, the K-nearest neighbors (KNN) of the Gaussians can be computed and their centers can be projected onto a plane defined by the first two eigenvectors of the covariance matrix using a singular value decomposition.

In one or more aspects, while optimizing Gaussian fields on training images can lead to learning distinct plane descriptors in spherical embeddings, using density-based clustering can suffer from limitations. Adjusting hyperparameters for this approach can be cumbersome and can hinder generalizability across datasets and scenes, leading to sub-optimal solutions.

Instead, the systems and techniques provide a probabilistic method for incorporating both descriptor information and spatial distribution of Gaussian primitives for accurate plane instance clustering. In one or more examples, the scene can be modeled as a GMM, which can be represented by a GMM-Tree. The tree can be built recursively from small GMMs at the leaves to a single node representing the entire scene at the root. Each child of the root can represent a distinct plane. Each node in the GMM-Tree can correspond to a spatial Gaussian distribution ($G_n(\mu_n, \Sigma_n)$) encompassing the centers (μ) of the Gaussian primitives within the same partition of the RAG derived from the training images. FIG. 17 is a diagram illustrating an example of a visualization 1700 of a root's child nodes in a GMM-Tree of a scene 1710, where the nodes can represent different Gaussian distributions 1720 that indicate distinct plane instances.

The actual Gaussian distributions can be assigned to the leaf nodes. Points can belong to multiple leaf nodes due to visibility in multiple images, and some nodes might be invalid due to errors. Nodes with high descriptor variance within the cluster can be filtered out. Finally, the similar nodes, based on the Bhattacharya Distance ($D_B$), between their respective Gaussian distributions can be merged. For two multivariate Gaussian distributions (Gi, Gj), the following can be computed:

$$D_B(G_i, G_j) = \frac{1}{8}(\mu_i - \mu_j)^T \sum^{-1} (\mu_i - \mu_j) + \frac{1}{2}\ln\left(\frac{\det\sum}{\sqrt{\det\sum_i \det\sum_j}}\right) \quad \text{(equation 7)}$$

where $$\sum = \frac{\sum_i + \sum_j}{2}.$$

The two Gaussians with the low $D_B$ value, can be merged as follows:

$$\sum_p = \sum_j \cdot \left(\sum_i + \sum_j\right)^{-1} \cdot \sum_i \quad \text{(equation 8)}$$

$$\mu_p = \sum_j \cdot \left(\sum_i + \sum_j\right)^{-1} \mu_i + \sum_i \cdot \left(\sum_i + \sum_j\right)^{-1} \cdot \mu_j \quad \text{(equation 9)}$$

where ($\mu_p$, $\Sigma_p$) can specify the Gaussian parameters of the parent node.

In some aspects, training of one or more of the machine learning systems or neural networks described herein (e.g., such as one or more of the machine learning systems or neural networks described with respect to FIG. 1 to FIG. 17) can be performed using online training (e.g., in some case on-device training), offline training, and/or various combinations of online and offline training. In some cases, online may refer to time periods during which input data (e.g., such as the images of FIG. 3, the images of FIG. 5, the images of FIG. 6, etc.) is processed, for instance for improvement or optimization of Planar Gaussian Splatting implemented by the systems and techniques described herein. In some examples, offline may refer to idle time periods or time periods during which input data is not being processed. Additionally, offline may be based on one or more time conditions (e.g., after a particular amount of time has expired, such as a day, a week, a month, etc.) and/or may be based on various other conditions such as network and/or server availability, etc., among various others. In some aspects, offline training of a machine learning model (e.g., a neural network model) can be performed by a first device (e.g., a server device) to generate a pre-trained model, and a second device can receive the trained model from the second device. In some cases, the second device (e.g., a mobile device, an XR device, a vehicle or system/component of the vehicle, or other device) can perform online (or on-device) training of the pre-trained model to further adapt or tune the parameters of the model.

FIG. 18 is a flow chart illustrating an example of a process 1800 for planar splatting (e.g., Planar Gaussian Splatting). The process 1800 can be performed by a computing device (e.g., SOC 100 of FIG. 1 and/or a computing device or computing system 1900 of FIG. 19) or by a component or system (e.g., a chipset, one or more processors such as one or more central processing units (CPUs), digital signal processors (DSPs), graphics processing units (GPUs), any combination thereof, and/or other type of processor(s), or other component or system) of the computing device. The operations of the process 1800 may be implemented as software components that are executed and run on one or more processors (e.g., processor 1910 of FIG. 19 or other processor(s)). Further, the transmission and reception of signals by the computing device in the process 1800 may be enabled, for example, by one or more antennas and/or one or more transceivers (e.g., wireless transceiver(s)).

At block 1810, the computing device (or component thereof) can segment, using a first neural network (e.g., a SAM, such as the SAM 620 of FIG. 6), one or more images (e.g., RGB images, such as the images 610 of FIG. 6) of a scene to determine a respective plurality of segments for each image of the one or more images. In some cases, the one or more images can be stored in one or more memories.

At block 1820, the computing device (or component thereof) can determine, using a second neural network (e.g., a normal neural network configured to predict normal vectors, such as the normal neural network 630 of FIG. 6), a respective plurality of normal vectors for each image of the one or more images. For instance, each normal vector of the respective plurality of normal vectors is orthogonal to a surface associated with a respective primitive (e.g., a Gaussian primitive or other type of primitive) of a plurality of primitives (e.g., a plurality of Gaussian primitives) associated with an image of the one or more images. In some cases, each primitive can include a learnable normal vector, a plane-instance embedding vector, and other parameters. Examples of Gaussian primitives are illustrated in, for example, FIG. 4 and FIG. 12.

At block 1830, the computing device (or component thereof) can generate a graph (e.g., a RAG, such as the RAG 640 of FIG. 6) based on each respective plurality of segments for each image, each respective plurality of normal vectors for each image, and a plurality of estimated planar distances (e.g., the estimated planar distances 650 of FIG. 6).

At block 1840, the computing device (or component thereof) can partition, based on each respective plurality of normal vectors and the plurality of estimated planar distances, the graph to determine a plurality of indexes associated with the plurality of primitives (e.g., Gaussian primitives). In some aspects, each segment of the plurality of segments is represented as a node of a plurality of nodes in the graph. In some cases, each node of the plurality of nodes is connected by one or more edges to one or more adjacent nodes of the plurality of nodes. In some aspects, to partition the graph, the computing device (or component thereof) can remove at least one of the one or more edges.

At block 1850, the computing device (or component thereof) can assign each descriptor of a plurality of descriptors to an index of the plurality of indexes based on a respective weight. For example, the computing device (or component thereof) can assign, based on the respective weight, each descriptor to the index of the plurality of indexes using linear regression (e.g., by the linear regression solver 670 of FIG. 6). In other examples, the assignment of each descriptor to the index can be performed using Hungarian matching algorithm, the Sinkhorn distance algorithm, or other algorithm. In some cases, the computing device (or component thereof) can update the plurality of descriptors using a recurrent-mean shift (e.g., the recurrent mean-shift layer 695 of FIG. 6).

At block 1860, the computing device (or component thereof) can merge primitives (e.g., Gaussian primitives) of the plurality of primitives with associated indexes of the plurality of indexes that are similar to each other. For example, the computing device (or component thereof) can merge the primitives with the associated indexes using a Gaussian tree (e.g., Gaussian tree 680 of FIG. 6).

In some cases, the computing device of process 1800 may include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing device may include a display, one or more network interfaces configured to communicate and/or receive the data, any combination thereof, and/or other component(s). The one or more network interfaces may be configured to communicate and/or receive wired and/or wireless data, including data according to the 3G, 4G, 5G, and/or other cellular standard, data according to the Wi-Fi (802.11x) standards, data according to the Bluetooth™ standard, data according to the Internet Protocol (IP) standard, and/or other types of data.

The components of the computing device of process 1800 can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein. The computing device may further include a display (as an example of the output device or in addition to the output device), a network interface configured to communicate and/or receive the data, any combination thereof, and/or other component(s). The network interface may be configured to communicate and/or receive Internet Protocol (IP) based data or other type of data.

The process 1800 is illustrated as a logical flow diagram, the operations of which represent a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, process 1800 may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Figure 19:
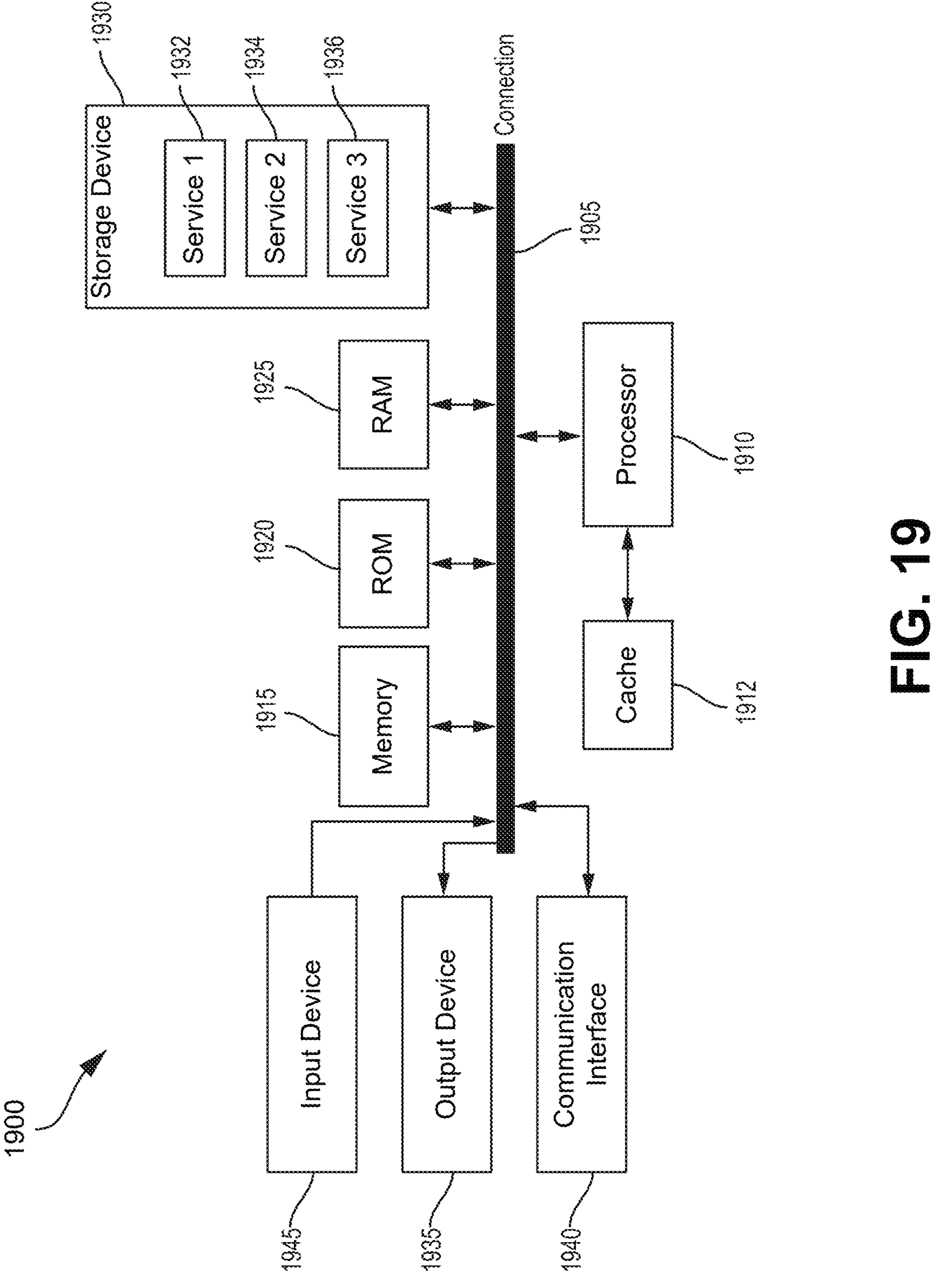
FIG. 19 is a diagram illustrating an example of a system for implementing certain aspects described herein.

FIG. 19 is a block diagram illustrating an example of a computing system 1900, which may be employed for Planar Gaussian Splatting. In particular, FIG. 19 illustrates an example of computing system 1900, which can be for example any computing device making up internal computing system, a remote computing system, a camera, or any component thereof in which the components of the system are in communication with each other using connection 1905. Connection 1905 can be a physical connection using a bus, or a direct connection into processor 1910, such as in a chipset architecture. Connection 1905 can also be a virtual connection, networked connection, or logical connection.

In some aspects, computing system 1900 is a distributed system in which the functions described in this disclosure can be distributed within a datacenter, multiple data centers, a peer network, etc. In some aspects, one or more of the described system components represents many such components each performing some or all of the function for which the component is described. In some aspects, the components can be physical or virtual devices.

Example system 1900 includes at least one processing unit (CPU or processor) 1910 and connection 1905 that communicatively couples various system components including system memory 1915, such as read-only memory (ROM) 1920 and random access memory (RAM) 1925 to processor 1910. Computing system 1900 can include a cache 1912 of high-speed memory connected directly with, in close proximity to, or integrated as part of processor 1910.

Processor 1910 can include any general purpose processor and a hardware service or software service, such as services 1932, 1934, and 1936 stored in storage device 1930, configured to control processor 1910 as well as a special-purpose processor where software instructions are incorporated into the actual processor design. Processor 1910 may essentially be a completely self-contained computing system, containing multiple cores or processors, a bus, memory controller, cache, etc. A multi-core processor may be symmetric or asymmetric.

To enable user interaction, computing system 1900 includes an input device 1945, which can represent any number of input mechanisms, such as a microphone for speech, a touch-sensitive screen for gesture or graphical input, keyboard, mouse, motion input, speech, etc. Computing system 1900 can also include output device 1935, which can be one or more of a number of output mechanisms. In some instances, multimodal systems can enable a user to provide multiple types of input/output to communicate with computing system 1900.

Computing system 1900 can include communications interface 1940, which can generally govern and manage the user input and system output. The communication interface may perform or facilitate receipt and/or transmission wired or wireless communications using wired and/or wireless transceivers, including those making use of an audio jack/plug, a microphone jack/plug, a universal serial bus (USB) port/plug, an Apple™ Lightning™ port/plug, an Ethernet port/plug, a fiber optic port/plug, a proprietary wired port/plug, 3G, 4G, 5G and/or other cellular data network wireless signal transfer, a Bluetooth™ wireless signal transfer, a Bluetooth™ low energy (BLE) wireless signal transfer, an IBEACON™ wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof.

The communications interface 1940 may also include one or more range sensors (e.g., LiDAR sensors, laser range finders, RF radars, ultrasonic sensors, and infrared (IR) sensors) configured to collect data and provide measurements to processor 1910, whereby processor 1910 can be configured to perform determinations and calculations needed to obtain various measurements for the one or more range sensors. In some examples, the measurements can include time of flight, wavelengths, azimuth angle, elevation angle, range, linear velocity and/or angular velocity, or any combination thereof. The communications interface 1940 may also include one or more Global Navigation Satellite System (GNSS) receivers or transceivers that are used to determine a location of the computing system 1900 based on receipt of one or more signals from one or more satellites associated with one or more GNSS systems. GNSS systems include, but are not limited to, the US-based GPS, the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 1930 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (e.g., Level 1 (L1) cache, Level 2 (L2) cache, Level 3 (L3) cache, Level 4 (L4) cache, Level 5 (L5) cache, or other (L #) cache), resistive random-access memory (RRAM/ReRAM), phase change memory (PCM), spin transfer torque RAM (STT-RAM), another memory chip or cartridge, and/or a combination thereof.

The storage device 1930 can include software services, servers, services, etc., that when the code that defines such software is executed by the processor 1910, it causes the system to perform a function. In some aspects, a hardware service that performs a particular function can include the software component stored in a computer-readable medium in connection with the necessary hardware components, such as processor 1910, connection 1905, output device 1935, etc., to carry out the function. The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

Specific details are provided in the description above to provide a thorough understanding of the aspects and examples provided herein, but those skilled in the art will recognize that the application is not limited thereto. Thus, while illustrative aspects of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, aspects can be utilized in any number of environments and applications beyond those described herein without departing from the broader scope of the specification. The specification and drawings are, accordingly, to be regarded as illustrative rather than restrictive. For the purposes of illustration, methods were described in a particular order. It should be appreciated that in alternate aspects, the methods may be performed in a different order than that described.

For clarity of explanation, in some instances the present technology may be presented as including individual functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the aspects in unnecessary detail. In other instances, well-known circuits, processes, algorithms, structures, and techniques may be shown without unnecessary detail in order to avoid obscuring the aspects.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Individual aspects may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code. Examples of computer-readable media that may be used to store instructions, information used, and/or information created during methods according to described examples include magnetic or optical disks, flash memory, USB devices provided with non-volatile memory, networked storage devices, and so on.

In some aspects the computer-readable storage devices, mediums, and memories can include a cable or wireless signal containing a bitstream and the like. However, when mentioned, non-transitory computer-readable storage media expressly exclude media such as energy, carrier signals, electromagnetic waves, and signals per se.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof, in some cases depending in part on the particular application, in part on the desired design, in part on the corresponding technology, etc.

The various illustrative logical blocks, modules, and circuits described in connection with the aspects disclosed herein may be implemented or performed using hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods, algorithms, and/or operations described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general-purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term “processor,” as used herein may refer to any of the foregoing structure, any combination of the foregoing structure, or any other structure or apparatus suitable for implementation of the techniques described herein.

One of ordinary skill will appreciate that the less than (“<”) and greater than (“>”) symbols or terminology used herein can be replaced with less than or equal to (“≤”) and greater than or equal to (“≥”) symbols, respectively, without departing from the scope of this description.

Where components are described as being “configured to” perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase “coupled to” or “communicatively coupled to” refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting “at least one of” a set and/or “one or more” of a set indicates that one member of the set or multiple members of the set (in any combination) satisfy the claim. For example, claim language reciting “at least one of A and B” or “at least one of A or B” means A, B, or A and B. In another example, claim language reciting “at least one of A, B, and C” or “at least one of A, B, or C” means A, B, C, or A and B, or A and C, or B and C, A and B and C, or any duplicate information or data (e.g., A and A, B and B, C and C, A and A and B, and so on), or any other ordering, duplication, or combination of A, B, and C. The language “at least one of” a set and/or “one or more” of a set does not limit the set to the items listed in the set. For example, claim language reciting “at least one of A and B” or “at least one of A or B” may mean A, B, or A and B, and may additionally include items not listed in the set of A and B. The phrases “at least one” and “one or more” are used interchangeably herein.

Claim language or other language reciting “at least one processor configured to,” “at least one processor being configured to," "one or more processors configured to," "one or more processors being configured to," or the like indicates that one processor or multiple processors (in any combination) can perform the associated operation(s). For example, claim language reciting "at least one processor configured to: X, Y, and Z" means a single processor can be used to perform operations X, Y, and Z; or that multiple processors are each tasked with a certain subset of operations X, Y, and Z such that together the multiple processors perform X, Y, and Z; or that a group of multiple processors work together to perform operations X, Y, and Z. In another example, claim language reciting "at least one processor configured to: X, Y, and Z" can mean that any single processor may only perform at least a subset of operations X, Y, and Z.

Where reference is made to one or more elements performing functions (e.g., steps of a method), one element may perform all functions, or more than one element may collectively perform the functions. When more than one element collectively performs the functions, each function need not be performed by each of those elements (e.g., different functions may be performed by different elements) and/or each function need not be performed in whole by only one element (e.g., different elements may perform different sub-functions of a function). Similarly, where reference is made to one or more elements configured to cause another element (e.g., an apparatus) to perform functions, one element may be configured to cause the other element to perform all functions, or more than one element may collectively be configured to cause the other element to perform the functions.

Where reference is made to an entity (e.g., any entity or device described herein) performing functions or being configured to perform functions (e.g., steps of a method), the entity may be configured to cause one or more elements (individually or collectively) to perform the functions. The one or more components of the entity may include at least one memory, at least one processor, at least one communication interface, another component configured to perform one or more (or all) of the functions, and/or any combination thereof. Where reference to the entity performing functions, the entity may be configured to cause one component to perform all functions, or to cause more than one component to collectively perform the functions. When the entity is configured to cause more than one component to collectively perform the functions, each function need not be performed by each of those components (e.g., different functions may be performed by different components) and/or each function need not be performed in whole by only one component (e.g., different components may perform different sub-functions of a function).

The various illustrative logical blocks, modules, engines, circuits, and algorithm steps described in connection with the embodiments disclosed herein may be implemented as electronic hardware, computer software, firmware, or combinations thereof. To clearly illustrate this interchangeability of hardware and software, various illustrative components, blocks, engines, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as engines, modules, or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC).

Illustrative aspects of the disclosure include:

Aspect 1. An apparatus to process one or more images, the apparatus comprising: one or more memories configured to store one or more images; and one or more processors coupled to the one or more memories and configured to: segment, using a first neural network, the one or more images of a scene to determine a respective plurality of segments for each image of the one or more images; determine, using a second neural network, a respective plurality of normal vectors for each image of the one or more images, wherein each normal vector of the respective plurality of normal vectors is orthogonal to a surface associated with a respective primitive of a plurality of primitives associated with an image of the one or more images; generate a graph based on each respective plurality of segments for each image, each respective plurality of normal vectors for each image, and a plurality of estimated planar distances; partition, based on each respective plurality of normal vectors and the plurality of estimated planar distances, the graph to determine a plurality of indexes associated with the plurality of primitives; assign each descriptor of a plurality of descriptors to an index of the plurality of indexes based on a respective weight; and merge primitives of the plurality of primitives with associated indexes of the plurality of indexes that are similar to each other.

Aspect 2. The apparatus of Aspect 1, wherein the first neural network is a segment anything model (SAM).

Aspect 3. The apparatus of any of Aspects 1 or 2, wherein the second neural network is a normal neural network.

Aspect 4. The apparatus of any of Aspects 1 to 3, wherein the graph is region adjacency graph (RAG).

Aspect 5. The apparatus of any of Aspects 1 to 4, wherein each segment of the plurality of segments is represented as a node of a plurality of nodes in the graph.

Aspect 6. The apparatus of Aspect 5, wherein each node of the plurality of nodes is connected by one or more edges to one or more adjacent nodes of the plurality of nodes.

Aspect 7. The apparatus of Aspect 6, wherein, to partition the graph, the one or more processors are configured to remove at least one of the one or more edges.

Aspect 8. The apparatus of any of Aspects 1 to 7, wherein the one or more processors are configured to update, using a recurrent-mean shift, the plurality of descriptors.

Aspect 9. The apparatus of any of Aspects 1 to 8, wherein the plurality of primitives includes a plurality of Gaussian primitives, and wherein the respective primitive is a Gaussian primitive.

Aspect 10. The apparatus of any of Aspects 1 to 9, wherein the one or more processors are configured to assign each descriptor to the index using linear regression.

Aspect 11. The apparatus of any of Aspects 1 to 10, wherein the one or more processors are configured to merge the primitives of the plurality of primitives with the associated indexes using a binary tree.

Aspect 12. The apparatus of Aspect 11, wherein the binary tree is a Gaussian tree.

Aspect 13. The apparatus of any of Aspects 1 to 12, further comprising one or more cameras configured to capture the one or more images.

Aspect 14. A method of processing one or more images, the method comprising: segmenting, using a first neural network, the one or more images of a scene to determine a respective plurality of segments for each image of the one or more images; determining, using a second neural network, a respective plurality of normal vectors for each image of the one or more images, wherein each normal vector of the respective plurality of normal vectors is orthogonal to a surface associated with a respective primitive of a plurality of primitives associated with an image of the one or more images; generating a graph based on each respective plurality of segments for each image, each respective plurality of normal vectors for each image, and a plurality of estimated planar distances; partitioning, based on each respective plurality of normal vectors and the plurality of estimated planar distances, the graph to determine a plurality of indexes associated with the plurality of primitives; assigning each descriptor of a plurality of descriptors to an index of the plurality of indexes based on a respective weight; and merging primitives of the plurality of primitives with associated indexes of the plurality of indexes that are similar to each other.

Aspect 15. The method of Aspect 14, wherein the first neural network is a segment anything model (SAM).

Aspect 16. The method of any of Aspects 14 or 15, wherein the second neural network is a normal neural network.

Aspect 17. The method of any of Aspects 14 to 16, wherein the graph is region adjacency graph (RAG).

Aspect 18. The method of any of Aspects 14 to 17, wherein each segment of the plurality of segments is represented as a node of a plurality of nodes in the graph.

Aspect 19. The method of Aspect 18, wherein each node of the plurality of nodes is connected by one or more edges to one or more adjacent nodes of the plurality of nodes.

Aspect 20. The method of Aspect 19, wherein the graph is partitioned by removing at least one of the one or more edges.

Aspect 21. The method of any of Aspects 14 to 20, further comprising updating, using a recurrent-mean shift, the plurality of descriptors.

Aspect 22. The method of any of Aspects 14 to 21, wherein the plurality of primitives includes a plurality of Gaussian primitives, and wherein the respective primitive is a Gaussian primitive.

Aspect 23. The method of any of Aspects 14 to 22, wherein each descriptor is to the index using linear regression.

Aspect 24. The method of any of Aspects 14 to 23, wherein the primitives of the plurality of primitives are merged with the associated indexes using a binary tree.

Aspect 25. The method of Aspect 24, wherein the binary tree is a Gaussian tree.

Aspect 18. A non-transitory computer-readable medium having stored thereon instructions that, when executed by one or more processors, cause the one or more processors to perform operations according to any of Aspects 14 to 25.

Aspect 19. An apparatus to process one or more images, the apparatus including one or more means for performing operations according to any of Aspects 14 to 25.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more."

What is claimed is:

1. An apparatus to process one or more images, the apparatus comprising:

one or more memories configured to store one or more images; and one or more processors coupled to the one or more memories and configured to:

segment, using a first neural network, the one or more images of a scene to determine a respective plurality of segments for each image of the one or more images;

determine, using a second neural network, a respective plurality of normal vectors for each image of the one or more images, wherein each normal vector of the respective plurality of normal vectors is orthogonal to a surface associated with a respective primitive of a plurality of primitives associated with an image of the one or more images;

generate a graph based on each respective plurality of segments for each image, each respective plurality of normal vectors for each image, and a plurality of estimated planar distances;

partition, based on each respective plurality of normal vectors and the plurality of estimated planar distances, the graph to determine a plurality of indexes associated with the plurality of primitives;

assign each descriptor of a plurality of descriptors to an index of the plurality of indexes based on a respective weight; and merge primitives of the plurality of primitives with associated indexes of the plurality of indexes that are similar to each other.

2. The apparatus of claim 1, wherein the first neural network is a segment anything model (SAM).

3. The apparatus of claim 1, wherein the second neural network is a normal neural network.

4. The apparatus of claim 1, wherein the graph is region adjacency graph (RAG).

5. The apparatus of claim 1, wherein each segment of the respective plurality of segments is represented as a node of a plurality of nodes in the graph.

6. The apparatus of claim 5, wherein each node of the plurality of nodes is connected by one or more edges to one or more adjacent nodes of the plurality of nodes.

7. The apparatus of claim 6, wherein, to partition the graph, the one or more processors are configured to remove at least one of the one or more edges.

8. The apparatus of claim 1, wherein the one or more processors are configured to update, using a recurrent-mean shift, the plurality of descriptors.

9. The apparatus of claim 1, wherein the plurality of primitives includes a plurality of Gaussian primitives, and wherein the respective primitive is a Gaussian primitive.

10. The apparatus of claim 1, wherein the one or more processors are configured to assign each descriptor to the index using linear regression.

11. The apparatus of claim 1, wherein the one or more processors are configured to merge the primitives of the plurality of primitives with the associated indexes using a binary tree.

12. The apparatus of claim 11, wherein the binary tree is a Gaussian tree.

13. The apparatus of claim 1, further comprising one or more cameras configured to capture the one or more images.

14. A method of processing images, the method comprising:

segmenting, using a first neural network, one or more images of a scene to determine a respective plurality of segments for each image of the one or more images;

determining, using a second neural network, a respective plurality of normal vectors for each image of the one or more images, wherein each normal vector of the respective plurality of normal vectors is orthogonal to a surface associated with a respective primitive of a plurality of primitives associated with an image of the one or more images;

generating a graph based on each respective plurality of segments for each image, each respective plurality of normal vectors for each image, and a plurality of estimated planar distances;

partitioning, based on each respective plurality of normal vectors and the plurality of estimated planar distances, the graph to determine a plurality of indexes associated with the plurality of primitives;

assigning each descriptor of a plurality of descriptors to an index of the plurality of indexes based on a respective weight; and merging primitives of the plurality of primitives with associated indexes of the plurality of indexes that are similar to each other.

15. The method of claim 14, wherein the first neural network is a segment anything model (SAM).

16. The method of claim 14, wherein the second neural network is a normal neural network.

17. The method of claim 14, wherein the plurality of primitives includes a plurality of Gaussian primitives, and wherein the respective primitive is a Gaussian primitive.

18. The method of claim 14, wherein each descriptor is to the index using linear regression.

19. The method of claim 14, wherein the primitives of the plurality of primitives are merged with the associated indexes using a binary tree.

20. The method of claim 19, wherein the binary tree is a Gaussian tree.

* * * * *